US007598899B2

(12) United States Patent  (10) Patent No.: US 7,598,899 B2
Allen et al.  (45) Date of Patent: Oct. 6, 2009

(54) METHOD AND APPARATUS FOR COMPRESSION OF SAR IMAGES

(75) Inventors: Josef Allen, Melbourne, FL (US); Emile Ganthier, Palm Bay, FL (US); Mark Rahmes, Melbourne, FL (US); Matthew Winter, West Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 121 days.

(21) Appl. No.: 11/689,706

(22) Filed: Mar. 22, 2007

(65) Prior Publication Data
US 2008/0231503 A1   Sep. 25, 2008

(51) Int. Cl.
*G01S 13/90*  (2006.01)
(52) U.S. Cl. .................. 342/25 R; 342/25 D; 342/25 F; 342/159; 342/194; 342/196
(58) Field of Classification Search .............. 342/25 R, 342/25 A–25 F, 159, 194–196
See application file for complete search history.

(56) References Cited

U.S. PATENT DOCUMENTS

| 6,897,802 | B1 * | 5/2005 | Daniell et al. ................. 342/90 |
| 7,474,249 | B1 * | 1/2009 | Williams et al. .......... 342/25 R |
| 7,508,334 | B2 * | 3/2009 | Allen et al. ................ 342/25 F |
| 7,538,712 | B2 * | 5/2009 | Allen et al. ................ 342/25 R |
| 2007/0083114 | A1 * | 4/2007 | Yang et al. .................. 600/437 |
| 2009/0015464 | A1 * | 1/2009 | Fukuda ....................... 342/194 |

OTHER PUBLICATIONS

Lacombe et al., Filtering Interferometric Phase Images by Anisotropic Diffusion, Sep. 14-17, 2003.
Smolka, On the Combined Forward and Backward Anisotropic Diffusion Scheme for the Multispectral Image Enhancement, 2002.
Schulze, An Edge-Enhancing Nonlinear Filter for Reducing Multiplicative Noise, Perceptive Scientific Instruments, Inc., Apr. 1997.
Xi et al., Anisotropic Diffusion Despeckling for High Resolution SAR Images, $25^{th}$ ACRS 2004, Chiang Mai, Thailand, Nov. 2004.
Theoharatos et al., Edge Detection of Multispectral Images Using Nonparametric Local Density Estimation, Proc. Signal Processing, Pattern Recognition and Applications, SPPRA 2003.
Lennon et al., Nonlinear Filtering of Hyperspectral Images with Anisotropic Diffusion, Proceedings of IGARSS, 2002.
Mastriani, New Wavelet-Based Superresolution Algorithm for Speckle Reduction in SAR Images, International Journal of Computer Science, vol. 1, No. 4, 2006.

(Continued)

*Primary Examiner*—John B Sotomayor
(74) *Attorney, Agent, or Firm*—Allen, Dyer, Doppelt, Milbrath & Gilchrist, P.A.

(57) ABSTRACT

A computer system for compressing synthetic aperture radar (SAR) images includes a database for storing SAR images to be compressed, and a processor for compressing a SAR image from the database. The compressing includes applying an anisotropic diffusion algorithm to the SAR image, and compressing the SAR image after applying the anisotropic diffusion algorithm thereto. Applying the anisotropic diffusion algorithm includes determining noise in the SAR, selecting a noise threshold for the SAR image based on the determined noise, and mathematically adjusting the anisotropic diffusion algorithm based on the selected noise threshold.

65 Claims, 40 Drawing Sheets

OTHER PUBLICATIONS

Marklund, An Anisotropic Evolution Formulation Applied in 2-D Unwrapping of Discontinuous Phase Surfaces, IEEE Transactions on Image Processing, vol. 10, No. 11, Nov. 2001.

Yang et al., Speckle Reduction and Structure Enhancement by Multichannel Median Boosted Anisotropic Diffusion, EURASIP Journal on Applied Signal Processing, 2004.

Yu et al., Speckle Reducing Anisotropic Diffusion, IEEE Transactions on Image Processing, vol. 11, No. 11, Nov. 2002.

Liu et al., SAR Image Compression Using Bandelets and SPIHT, Radar, International Conf. ON, IEEE, PT, Oct. 1, 2006, pp. 1-4.

Perona et al., Scale-Space and Edge Detection Using Anistropic Diffusion, IEEE Transactions On Pattern Analysis And Machine Intelligence, IEEE Service Ctr, vol. 12, No. 7, Jul. 1, 1990, pp. 629-639.

Gorman et al., Assessing The Impact Of Image Compression On SAR Automatic Target Detection and Cuing, Radar Conf. 1996, May 13, 1996, pp. 118-123.

Allen et al., Anistropic Diffusion Techniques On Synthetic Aperture Radar Data, Proceedings of SPIE-The International Society For Optical Engineering, vol. 6547, Apr. 12, 2007, pp. 654703-1.

Sartor et al., Preprocessing Of SAR Interferometric Data Using Anistropic Diffusion Filter, Proceedings of SPIE- The International Society for Optical Engineering, vol. 6568, Apr. 10, 2007, pp. 1-12.

* cited by examiner

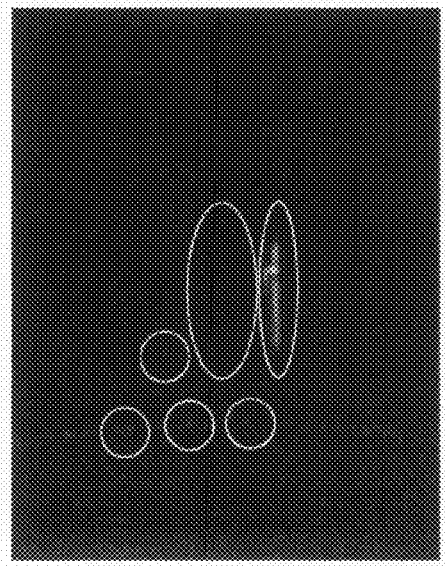
FIG. 10 (PRIOR ART) GAUSSIAN
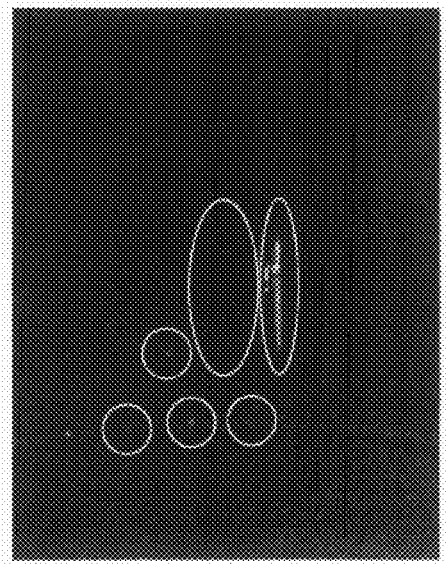
FIG. 12 NOISE REMOVAL ANISOTROPIC
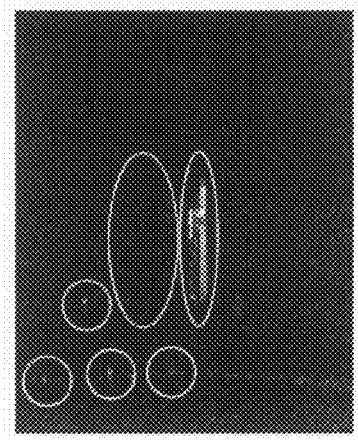
FIG. 8 ORIGINAL
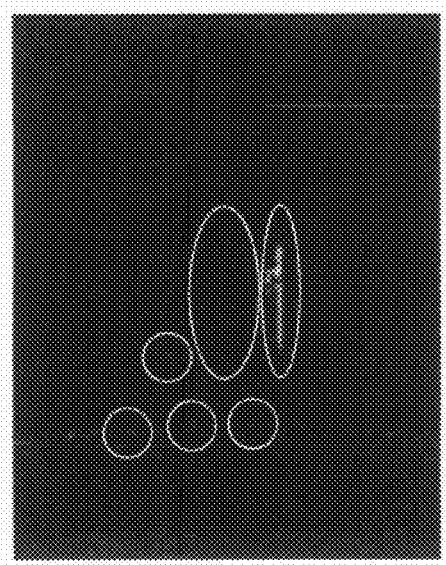
FIG. 9 (PRIOR ART) 3X3
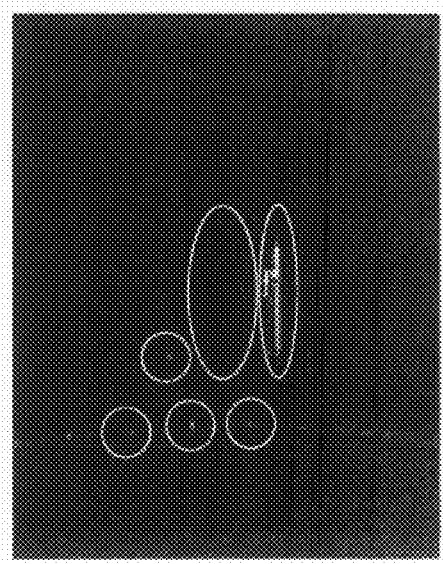
FIG. 11 (PRIOR ART) ANISOTROPIC

ORIGINAL CLOSE VECTOR MULTI-SPECTRAL IMAGE

SHOCK FILTER CLOSE UP VECTOR MULTI-SPECTRAL IMAGE

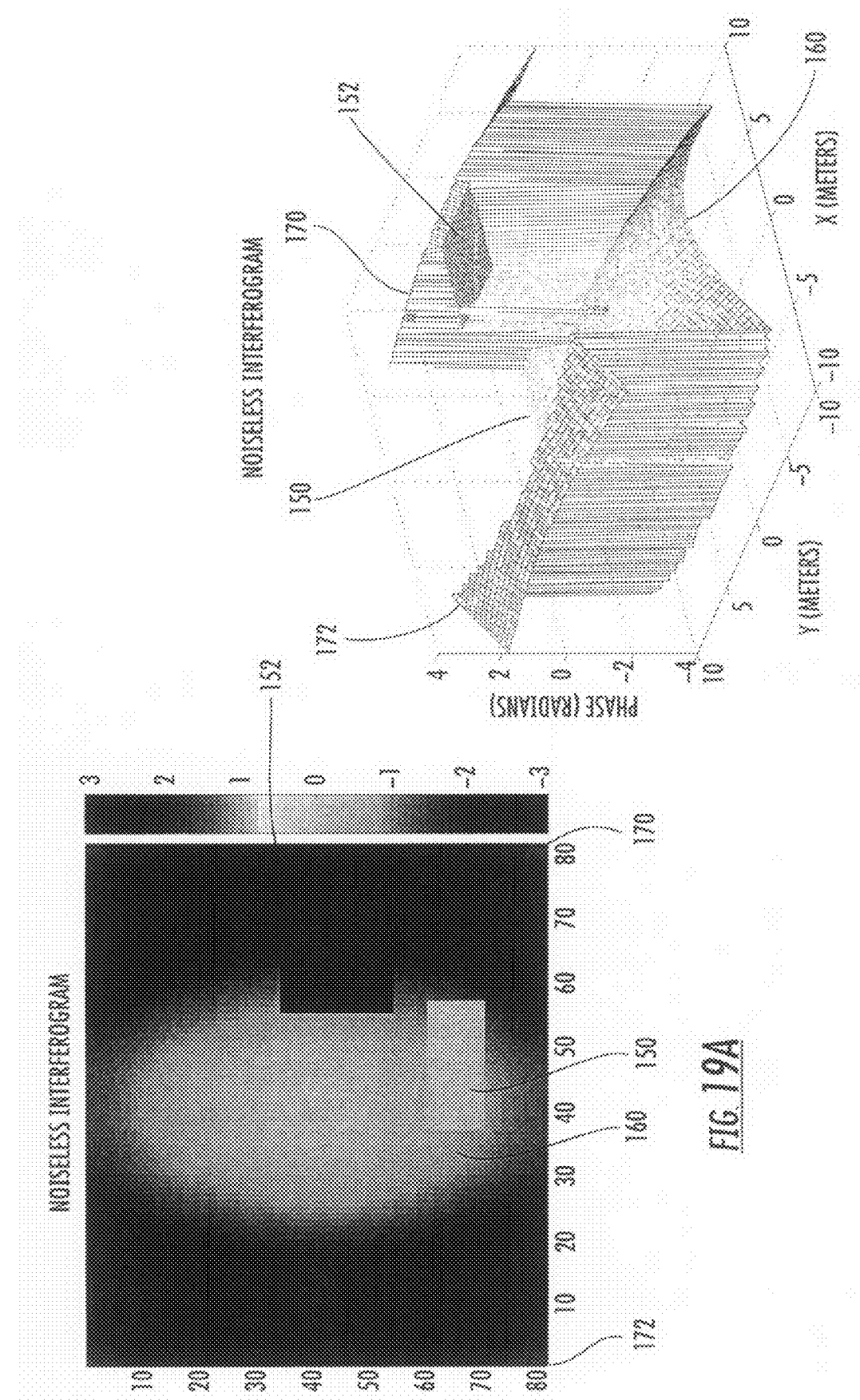

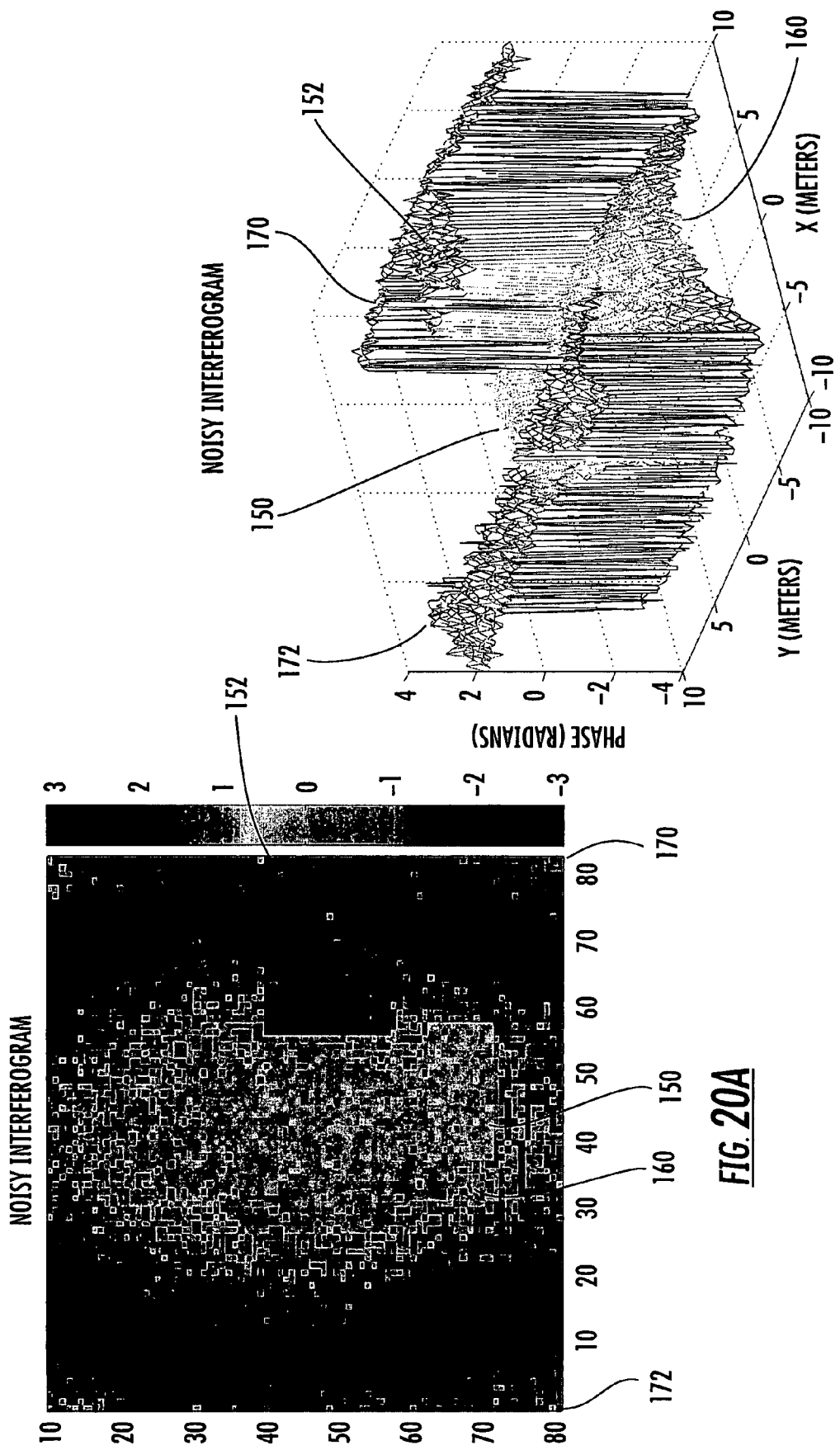

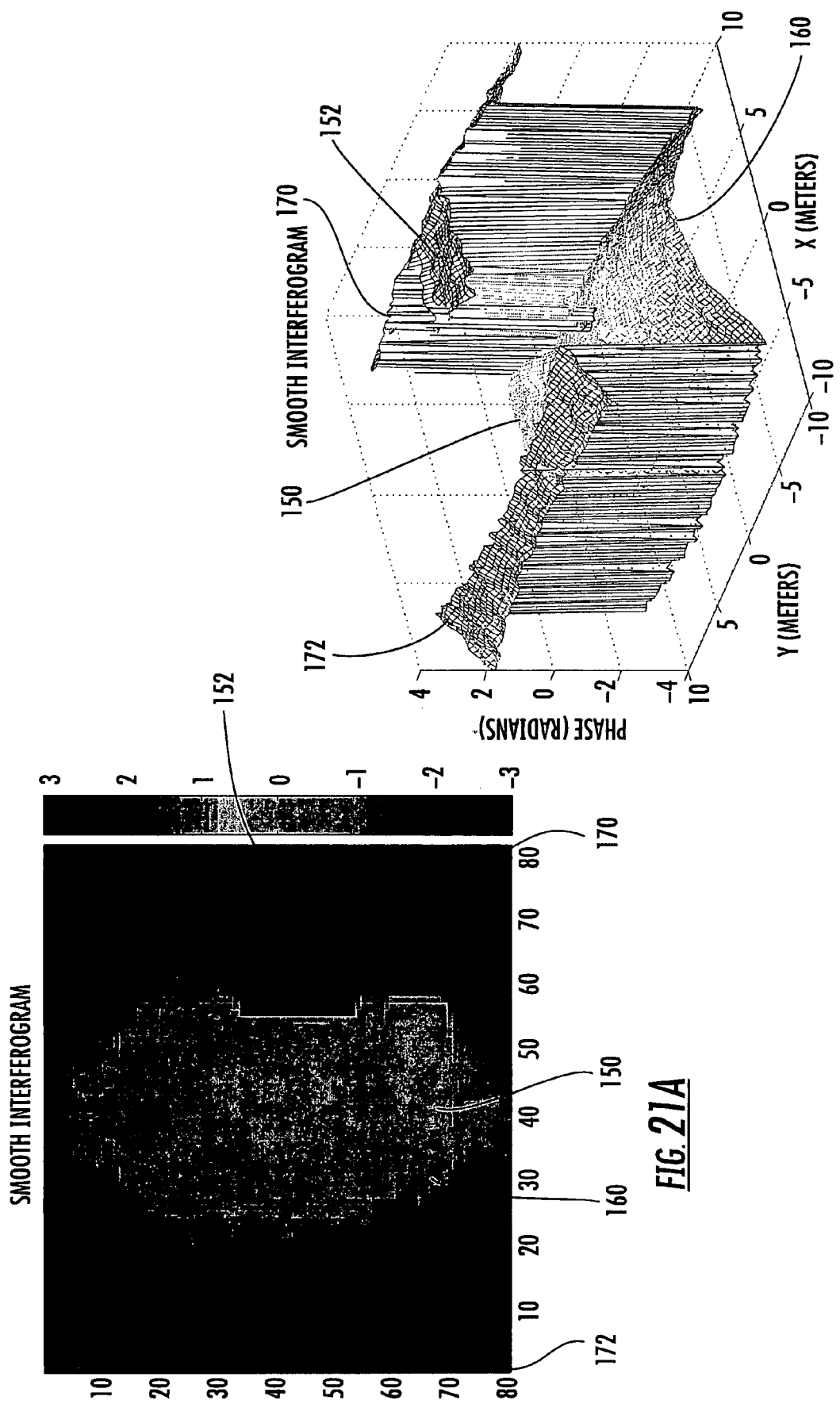

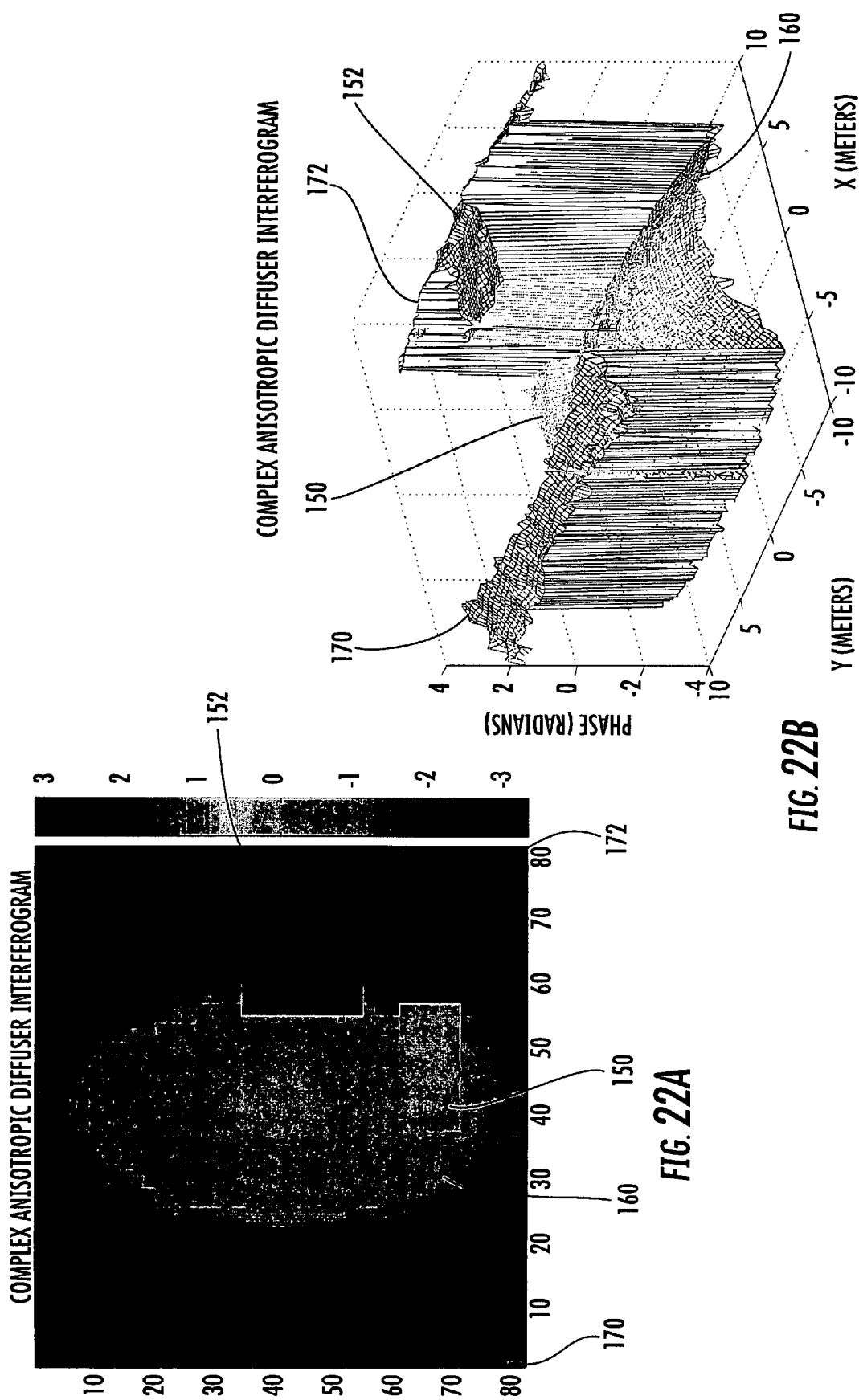

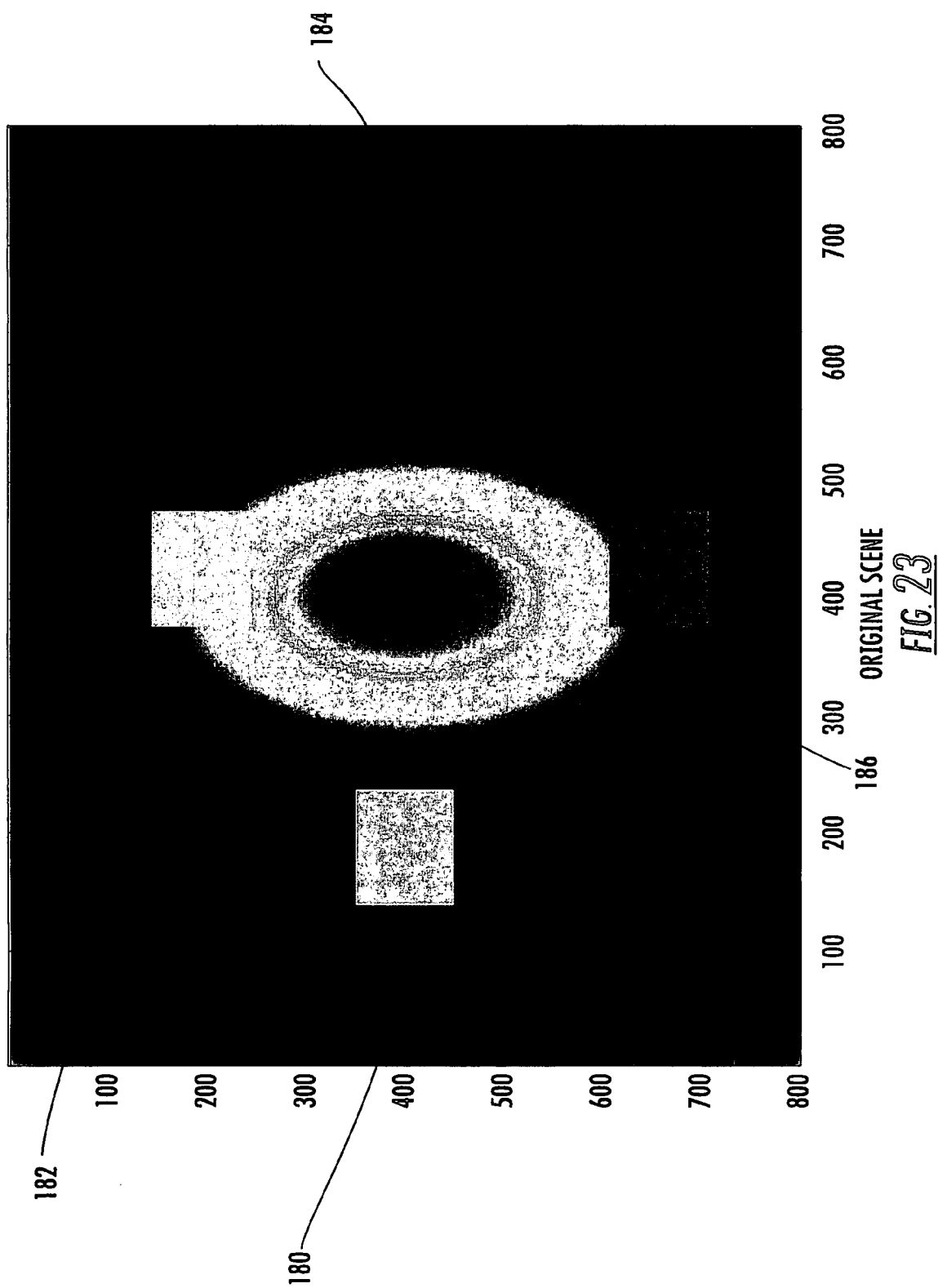
FIG. 23 ORIGINAL SCENE

NOISELESS INTERFEROGRAM

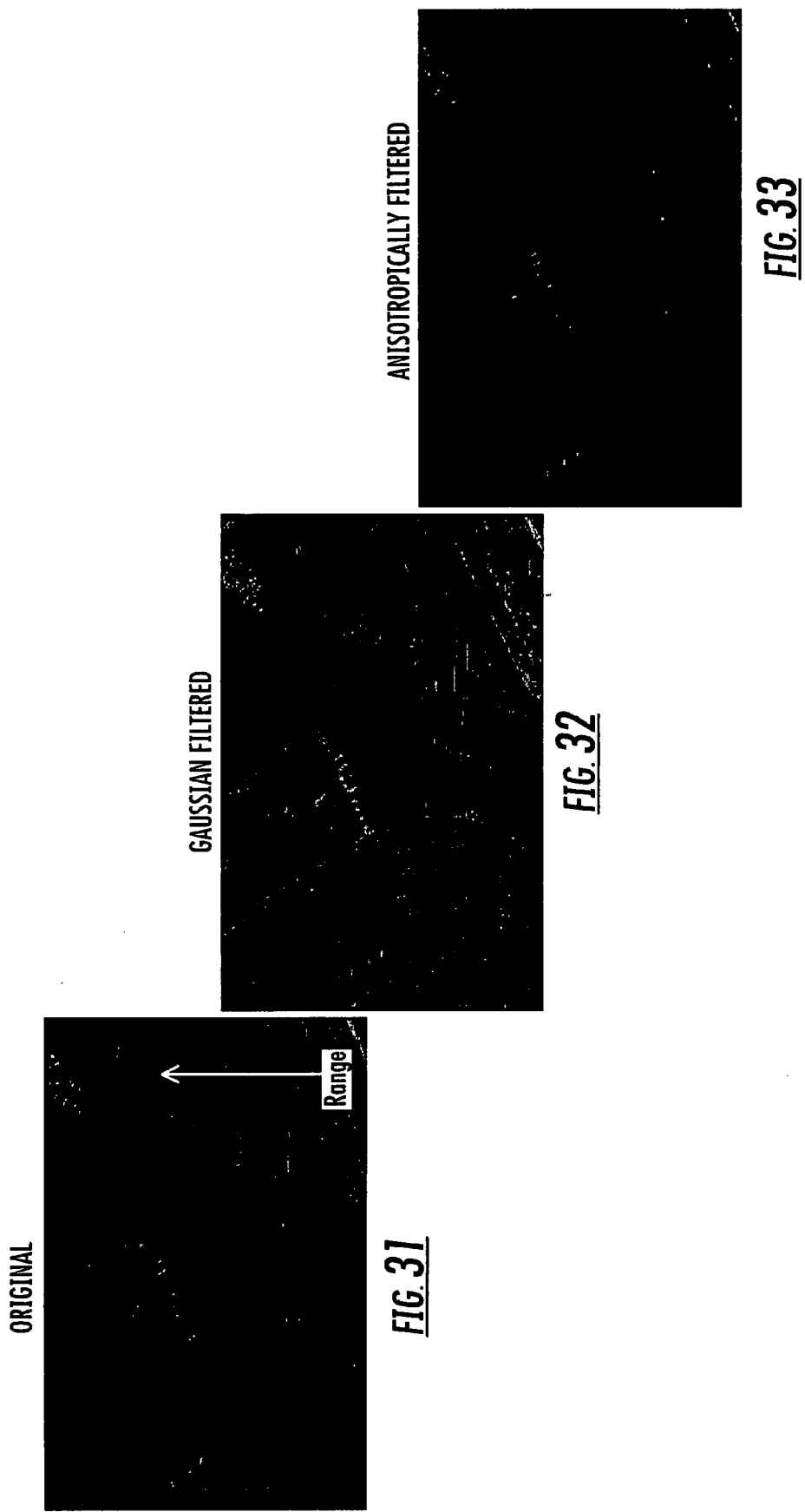
FIG. 31 ORIGINAL
FIG. 32 GAUSSIAN FILTERED
FIG. 33 ANISOTROPICALLY FILTERED

ORIGINAL

NON-LINEAR DYNAMIC RANGE COMPRESSION AND QUANTIZED

TREE AND SHADOWS ARE NOT WELL DEFINED

FIG. 36 DECOMPRESS WITH ANISOTROPIC DIFFUSION

TREE AND SHADOWS ARE BETTER DEFINED

UNREGISTERED IMAGE 1

UNREGISTERED IMAGE 2

CORRELATION SURFACE UNFILTERED

CORRELATION SURFACE FILTERED

PIXEL SHIFTED IMAGE 1 (UNFILTERED)

PIXEL SHIFTED IMAGE 2 (UNFILTERED)

PIXEL SHIFTED IMAGE 1 (FILTERED)

PIXEL SHIFTED IMAGE 2 (FILTERED)

METHOD AND APPARATUS FOR COMPRESSION OF SAR IMAGES

FIELD OF THE INVENTION

The present invention relates to the field of image processing, and more particularly, to processing synthetic aperture radar (SAR) images.

BACKGROUND OF THE INVENTION

The resolution of SAR data is not comparable to the resolution of electro-optical (EO) data. EO sensors include photographic and other optical imaging devices, such as light detection and ranging (LIDAR) collectors. EO sensors are passive in that they capture the reflectivity of light from scenes to provide photographic images thereof. However, EO sensors are limited by time-of-day and atmospheric conditions.

A synthetic aperture radar (SAR) is advantageous in that images can be acquired day or night, as well as in inclement weather. A SAR is active in that it records back-scattered radiation from radio frequency (RF) signals to generate SAR images. Each resolution cell of the SAR generally has many scatterers. The phases of the return signals from these scatterers are randomly distributed, and the resulting interference causes speckle.

Speckle gives a grainy appearance in the detected image that is finally viewed, and hence a lower resolution when compared to an EO image. Speckle imposes a significant limitation on the accuracy of the measurements that can be made. For instance, mensuration is often inclusive in SAR data. Side-lobe interference also creates a noisy look to the SAR data. In addition, hardware malfunctions or radio interference can decrease the fidelity of the SAR data.

SAR data is currently being treated with some form of apodization in which the main and side lobes are removed. However, apodization makes SAR data look binary. This also results in the detected image having a grainy appearance. SAR data is also being treated with low pass filters, such as Taylor weighting. However, the scatterers can become blurred together resulting in a reduced resolution. As a result of the current approaches used to treat SAR data, certain analysis applications can be inclusive, including registration, road detection, change detection, elevation extraction and mensuration.

For SAR images that contain speckle, an enhancement goal is to remove the speckle without destroying important image features. The brightness of a pixel is determined not only by properties of the scatterers in the resolution cell, but also by the phase relationships between the returns from these scatterers. In certain applications, however, the removal of speckle may be counterproductive. An example in which speckle preservation is important is where detection of features is of the same scale as the speckle patterns. A known technique for despeckling SAR data as well as resolution enhancement is the application of anisotropic diffusion algorithms.

One approach for despeckling SAR data is disclosed in the article titled "Speckle Reducing Anisotropic Diffusion" by Yu et al. A partial differential equation (PDE) approach is used for speckle removal. In particular, an image scale space is generated, which is a set of filtered images that vary from fine to coarse. Another approach is disclosed in the article titled "Anisotropic Diffusion Despeckling For High Resolution SAR Images" by Xi et al. A non-linear diffusion filtering algorithm based on a discretization scheme, i.e., an additive operator splitting (AOS) scheme, is applied in the discrete image data. While both of these approaches result in improving the resolution of the SAR data by reducing noise and preserving edges, there is still a demand to make SAR data look more like high resolution EO data.

SUMMARY OF THE INVENTION

In view of the foregoing background, it is therefore an object of the present invention to improve the resolution of SAR data to look more like EO data.

This and other objects, features, and advantages in accordance with the present invention are provided by a computer-implemented method for processing synthetic aperture radar (SAR) images comprising determining noise in a SAR image to be processed, selecting a noise threshold for the SAR image based on the determined noise, and mathematically adjusting an anisotropic diffusion algorithm based on the selected noise threshold. The adjusted anisotropic diffusion algorithm is applied to the SAR image.

The noise may be determined based on statistical analysis of the gradient values of the SAR image. The statistical analysis may be based on a standard deviation of the gradient values plus a constant, for example. Alternatively, the noise may be determined based on a Fourier windowing scheme or a wavelet decomposition.

The anisotropic diffusion algorithm may be based on a heat equation comprising a non-constant term. Mathematically adjusting the anisotropic diffusion algorithm may comprise adjusting the non-constant term based on the selected noise threshold. By adjusting the non-constant term, this advantageously allows the heat equation to be tailored to the SAR data being processed. As a result, a class of functions can be created for obtaining the desired results, wherein each function corresponds to specific SAR data being processed. Disparate SAR data sets can be better processed for improving the resolution of the viewed SAR image.

Another aspect of the invention is directed to a complex anisotropic diffusion algorithm. The equations for the above described anisotropic diffusion algorithm have been re-derived for complex data so that the process is now non-linear. In terms of complex data, the real and imaginary components of a SAR data set are processed at a same time. Since the real and imaginary components of the SAR data set are being treated as a complex object, the complex anisotropic diffusion algorithm is able to pull out scene content from extremely noisy data, which in turn improves the resolution of the viewed SAR image.

A computer-implemented method for processing complex SAR images comprises receiving a complex SAR data set for a SAR image comprising a plurality of pixels, and applying the complex anisotropic diffusion algorithm to the complex SAR data set. The complex SAR data set comprises a real and an imaginary part for each pixel. If the complex SAR dataset is received in frequency space, the frequency space is converted to image space. The frequency space corresponds to phase and power for each pixel, and image space corresponds to phase and amplitude for each pixel.

The complex anisotropic diffusion algorithm may also be used in interferometric processing of SAR data, particularly for subsidence measurements in urban areas, for example. Subsidence is a terrain displacement in which the elevation of the earth's surface is decreasing relative to sea level.

A computer-implemented method for processing interferometric SAR images comprises receiving first and second complex SAR data sets of a same scene, with the second complex SAR data set being offset in phase with respect to the first complex SAR data set. Each complex SAR data set may comprise a plurality of pixels. An interferogram is formed based on the first and second complex SAR data sets for providing a phase difference therebetween. The complex anisotropic diffusion algorithm is applied to the interferogram, wherein the interferogram comprises a real and an imaginary part for each pixel. A shock filter is applied to the interferogram.

The complex anisotropic diffusion algorithm locally mitigates noise while at the same time preserving scene discontinuities in the interferogram. The shock filter is used for image deblurring. The non-linear smoothing via the complex anisotropic algorithm and the boundary enhancement via the shock filter increases the accuracy and quality of the phase difference measurement. Since subsidence is measured using persistent objects in the scene (i.e., buildings) as reference points, improving boundary quality of the persistent objects improves the subsidence measurement.

The method may further comprise performing a two-dimensional variational phase unwrapping on the interferogram after application of the shock filter. The phase difference between the two registered SAR images is related to a desired physical quantity of interest, such as surface topography. The phase difference can be registered only modulo $2\pi$, and current interferometric techniques mainly recover the absolute phase (the unwrapped phase) from the registered one (wrapped phase) using discrete values which has a tendency to smooth the data.

The variational phase unwrapping algorithm in accordance with the present invention may be based on a cost function for controlling the smoothing. Instead of providing a global smoothing based on the properties of the data, the variational phase unwrapping algorithm leaves edges intact and selectively smoothes the area adjacent the edges. As a result, interferometric processing of SAR data based on the complex anisotropic diffusion algorithm, the shock filter and the variational phase unwrapping collectively improve boundary quality which in turn improves the subsidence measurement.

The anisotropic diffusion algorithm may also be used in compressing and decompressing SAR images. An advantage of applying the anisotropic diffusion algorithm is that the size of the SAR image after compression results in a smaller size file, regardless of the compression scheme used. In terms of decompressing a SAR image, by dynamically compressing the SAR data, quantizing that data, and then decompressing with the anisotropic diffusion algorithm a smaller size file is also achieved. The greater the dynamic range the better the compression ratio. As a result, storage and transmission of the compressed and decompressed SAR images based on the anisotropic diffusion algorithm occupies less space and bandwidth.

The anisotropic diffusion algorithm may also be used in elevation extraction and registration for SAR images. A computer-implemented method for registering SAR images comprises selecting first and second SAR images to be registered, individually processing the selected first and second SAR images with an anisotropic diffusion algorithm, and registering the first and second SAR images after the processing. The method may further comprise applying a shock filter to the respective first and second processed SAR images before the registering. This scheme provides higher accuracy for SAR image registration, which in turn allows elevation data to be better extracted based on the registered SAR images.

Yet another application of the anisotropic diffusion algorithm and a shock filter is with respect to vector and road extraction for material classification. A computer-implemented method for vector extraction in SAR images comprises selecting a SAR image for vector extraction, processing the selected SAR image with an anisotropic diffusion algorithm, and extracting vector data based on the processed SAR image. The shock filter may be applied to the processed SAR image before the extracting. Road image data may then be extracted based on the extracted vector data. The data is thus delineated using a coherent scheme of the anisotropic diffusion algorithm. This scheme provides higher accuracy for road extraction.

BRIEF DESCRIPTION OF THE DRAWINGS

FIG. 8 is an original image before filtering in accordance with the present invention.

FIGS. 9, 10 and 11 are images corresponding to the original image shown in FIG. 8 after filtering in accordance with the prior art.

FIG. 12 is an image corresponding to the original image shown in FIG. 8 after filtering with an anisotropic diffusion algorithm in accordance with the present invention.

FIGS. 19A-22B are two-dimensional and three-dimensional images corresponding to the original scene shown in FIGS. 18A and 18B illustrating various stages of application of interferometric SAR processing in accordance with the present invention.

FIG. 23 is a top down two-dimensional image of an original scene before interferometric processing in accordance with the present invention.

FIGS. 31-33 are images illustrating compression of SAR data in accordance with the present invention.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
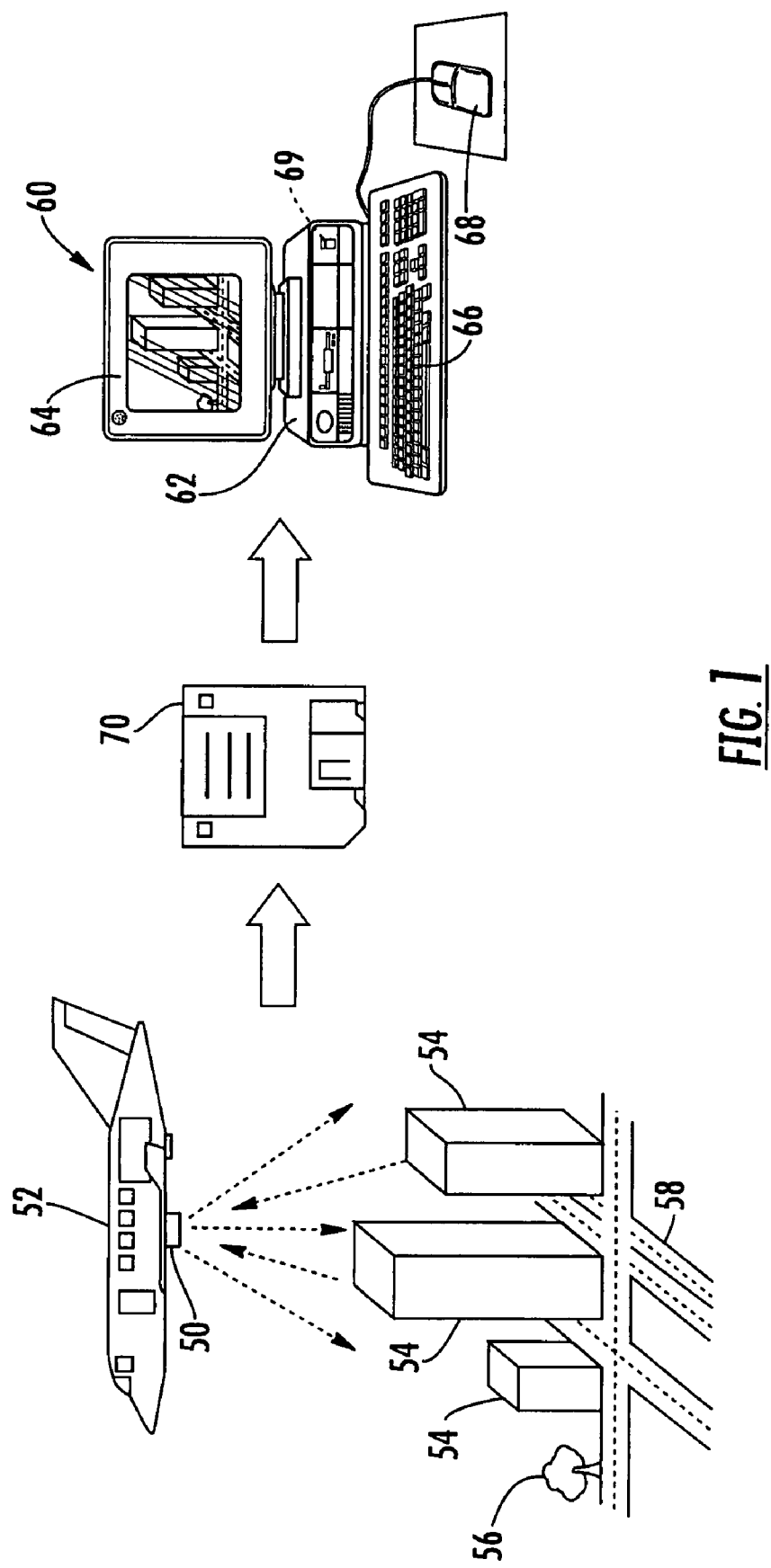
FIG. 1 is a schematic block diagram of collecting and processing SAR images in accordance with the present invention.

Referring initially to FIG. 1, a synthetic aperture radar (SAR) 50 collects SAR data and a computer-implemented system 60 processes the SAR data. The SAR 50 is carried by an airborne platform 52, such as an aircraft, over an area of interest. The airborne platform 52 could also be space-based.

The illustrated area of interest is an urban area, such as a city, that includes a number of buildings 54. Also included in the urban area are relatively small features such as trees 56 and roads 58, for example, as compared to the buildings 54. Alternatively, the area of interest could be a rural area, with very few if not any buildings 54.

Those of skill in the art will appreciate that a SAR image is first received as a complex value before being converted to a real value for viewing. The SAR image is initially received in k space that includes phase and power. By taking the inverse Fourier transform of the returned data in k space, an image space is generated. The image space includes phase and amplitude. Since the image space includes phase and amplitude information, it suffers from speckle. To view the SAR image, the phase is removed from the image space by taking the magnitude of the data in image space. This produces a detected or real image for viewing.

Once the SAR images are collected, they may be stored on a storage medium 70, such as a magnetic disk, for example, for transfer to a computer 62. Within the computer 62, the SAR images may be stored as part of a database of SAR images to be processed. Of course, other suitable methods for transferring SAR data may also be used, as readily appreciated by those skilled in the art. The collected SAR images may be complex or real valued.

A display 64 is connected to the computer 62 for viewing the SAR images after processing. Input devices such as a keyboard 66 and mouse 68 are also connected to the computer 62. In accordance with the present invention, the computer 62 includes a processor 68 for processing the SAR images.

One aspect for improving the resolution of SAR data to look more like EO data is based upon modifying a heat equation, which is a second order linear partial differential equation. The heat equation is as follows:

$$\frac{\partial u(x,t)}{\partial t} = c\nabla^2 u(x,t), c \in \mathbb{R} \quad (1)$$

or $$= div(c\nabla u(x,t)) = \nabla \cdot c\nabla u(x,t)$$

Under certain conditions, a fundamental solution of the heat equation is the Gaussian density function. The heat equation can also be written as follows:

$$\frac{\partial u(x,y,t)}{\partial t} = div(c(x,y,t)\nabla u(x,y,t)), c \in \mathbb{R} \quad (2)$$

$$= c(x,y,t)\nabla^2 u(x,y,t) + \nabla c(x,y,t) \cdot \nabla u(x,y,t)$$

The variable c is known as a convection function, and t corresponds to time, and x and y forms a complex number based upon the collected SAR data. In accordance with the present invention, the variable c is not a constant value. This advantageously allows the heat equation to be tailored to the SAR data being processed since c is not a constant value.

As a result, a class of functions can be created for obtaining the desired results, wherein each function corresponds to specific SAR data being processed. Within an urban area, the scatterers in one SAR data set may be different from the scatterers in another SAR data set so that the respective SAR data sets are disparate.

Since the SAR data sets are not similar, application of a same function (i.e., an anisotropic diffusion algorithm) results in improving the resolution of the SAR data set more closely matched to the function. For the other SAR data set that is not closely matched to the function, the resolution thereof will not be as good as if a more closely matched function was used. The same may be said about data sets from rural areas.

By changing the convection function c to better match a particular SAR data set, then the corresponding real value image for viewing will have a better resolution than if c was a constant value. When the convection function c is a constant value, the disparate SAR data sets are treated equally. A non-constant c allows the anisotropic diffusion algorithm to simultaneously blur and sharpen a SAR data set. By mathematically adjusting the heat equation via the convection function c, disparate SAR data sets can be better processed.

To mathematically adjust the heat equation, noise in the SAR data set needs to be determined. One approach for determining noise is based on gathering statistics on the gradient values in each SAR data set to be processed. The statistics can be gathered on the actual SAR data set itself, or they may be predetermined based on similar SAR data sets that have already been processed. Other approaches for determining noise include a Fourier windowing scheme or a wavelet decomposition, as readily understood by those skilled in the art.

Figure 2:
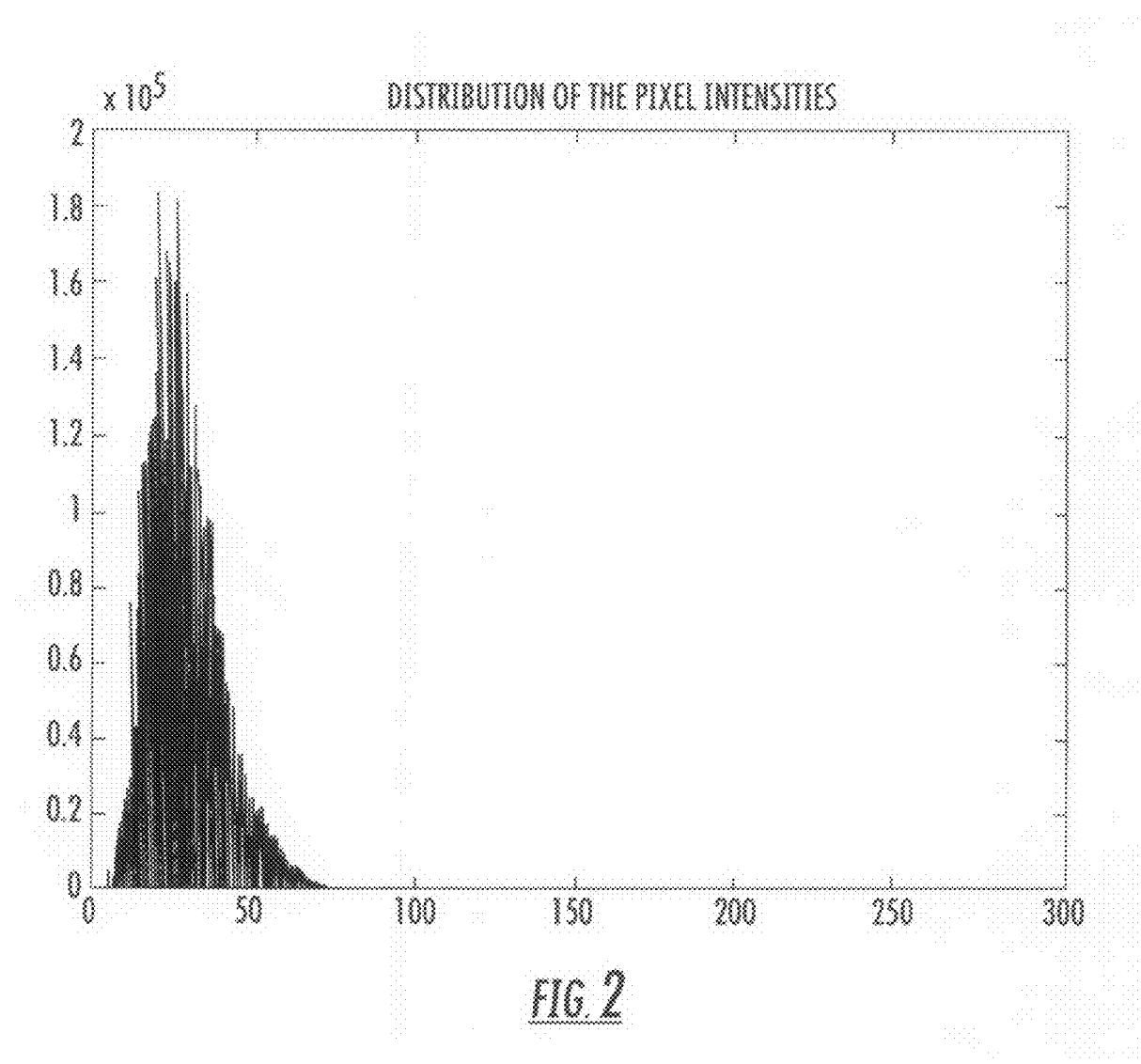
FIGS. 2 and 3 are respective distribution plots of pixel intensities and gradient values for a SAR data set in accordance with the present invention.
Figure 3:
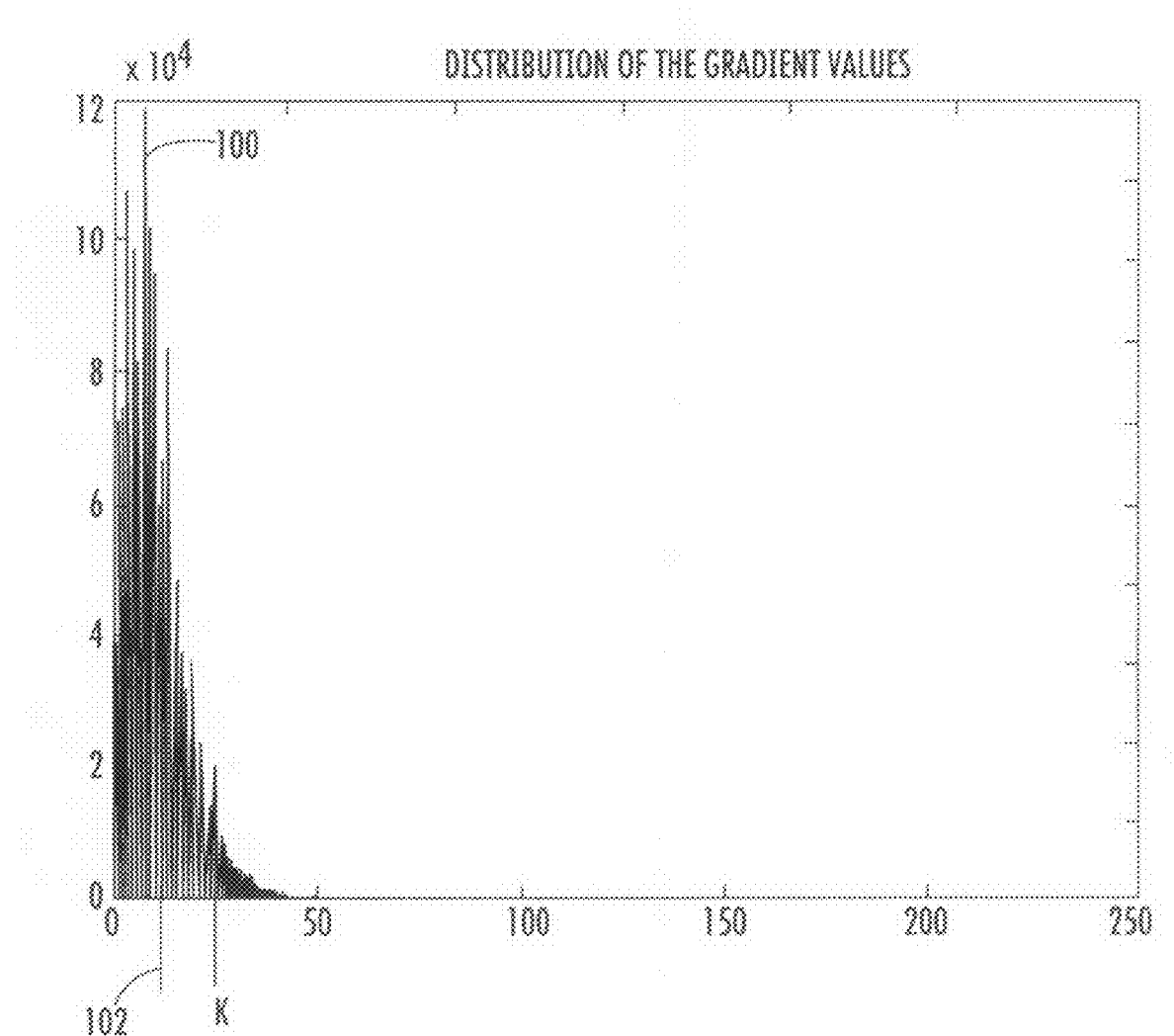
Figure 4:
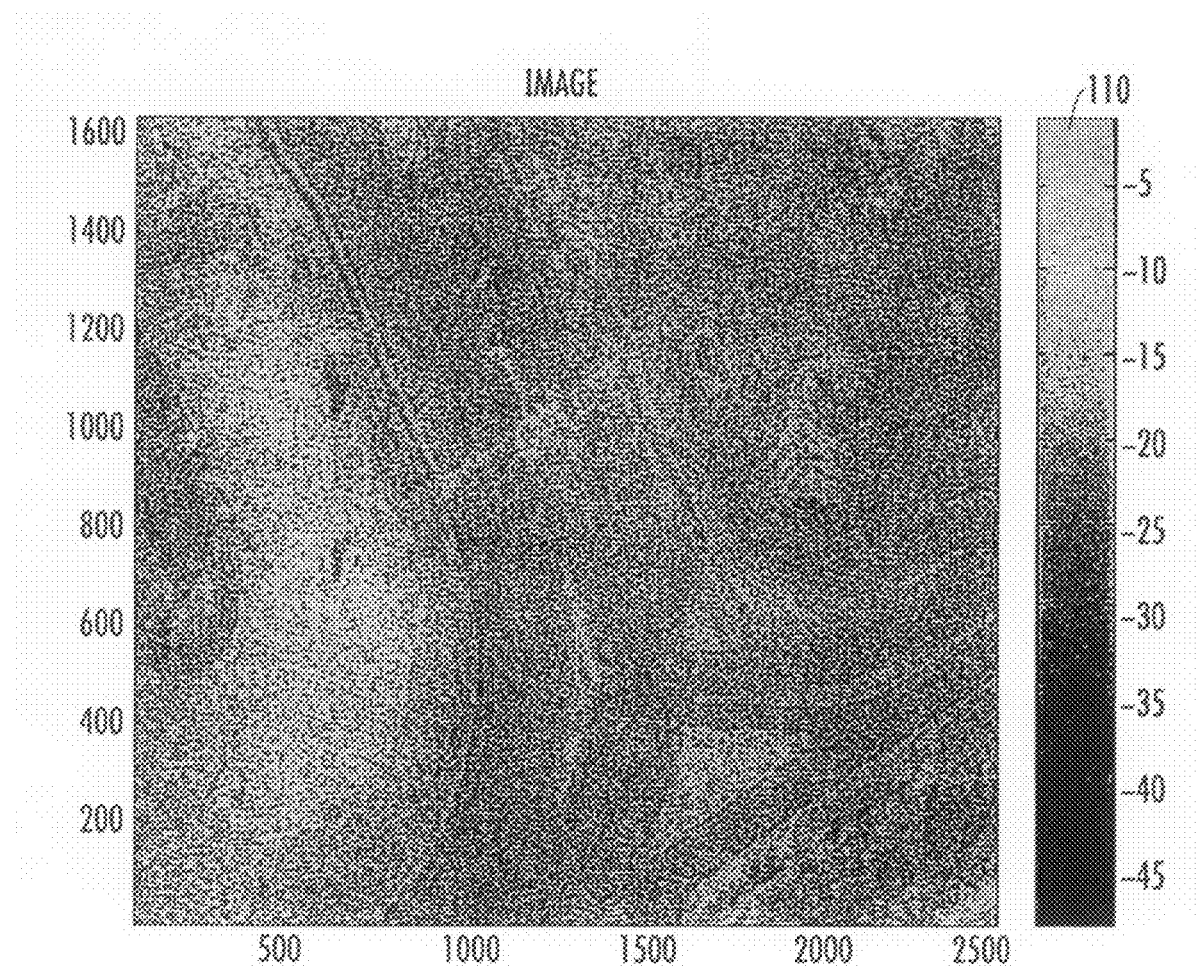
FIG. 4 is an image of the SAR data set corresponding to the plots shown in FIGS. 2 and 3.

Reference is directed to FIGS. 2-4 to illustrate calculation of the noise in a SAR data set based on statistical analysis, which in turn is used to mathematically adjust the convection function c within the anisotropic diffusion algorithm to be applied to the SAR data set. A distribution of the pixel intensities for the SAR data set is provided in FIG. 2, whereas distribution of the gradient values for the pixels is provided in FIG. 3. The distribution of gradient values is the number of gradient values at a same value. For instance, the spike 100 that peaks at 12×10⁴ means that there are 120,000 gradients that are at the same value.

Gathering statistics on the noise may be based on a standard deviation of the gradient values. Once the standard deviation is determined, a predetermined constant may be added to a multiple of the standard deviation to obtain the noise threshold k. Once the noise threshold k has been determined for the SAR data set, the corresponding anisotropic diffusion algorithm is applied to smooth the values to the right of k while not smoothing the values to the left of k. By not smoothing the values to the left of the k, the edges in the scene are preserved.

The standard deviation for the illustrated distribution of gradient values in FIG. 3 is indicated by the line corresponding to reference 102. The threshold k is set as two times the standard deviation plus a constant. Variations of this approach as well as other statistical approaches may be used to select the desired threshold k, as readily appreciated by those skilled in the art.

The threshold k is known as the k value. High gradient values correspond to bright scatterers, which are to remain unchanged. Therefore, the k value is set without blurring the bright scatterers. In contrast, the gradient values that look similar are to be smoothed. By adjusting the threshold k, different classes of functions can be used to create the desired results specific to the SAR data set being processed. An advantage of adjusting the convection function c via the noise threshold k is that the end user does not have to select among multiple anisotropic diffusion algorithms the one that is better suited for processing the SAR data set. Instead, this selection is done autonomously once the noise threshold k has been selected.

Figure 5:
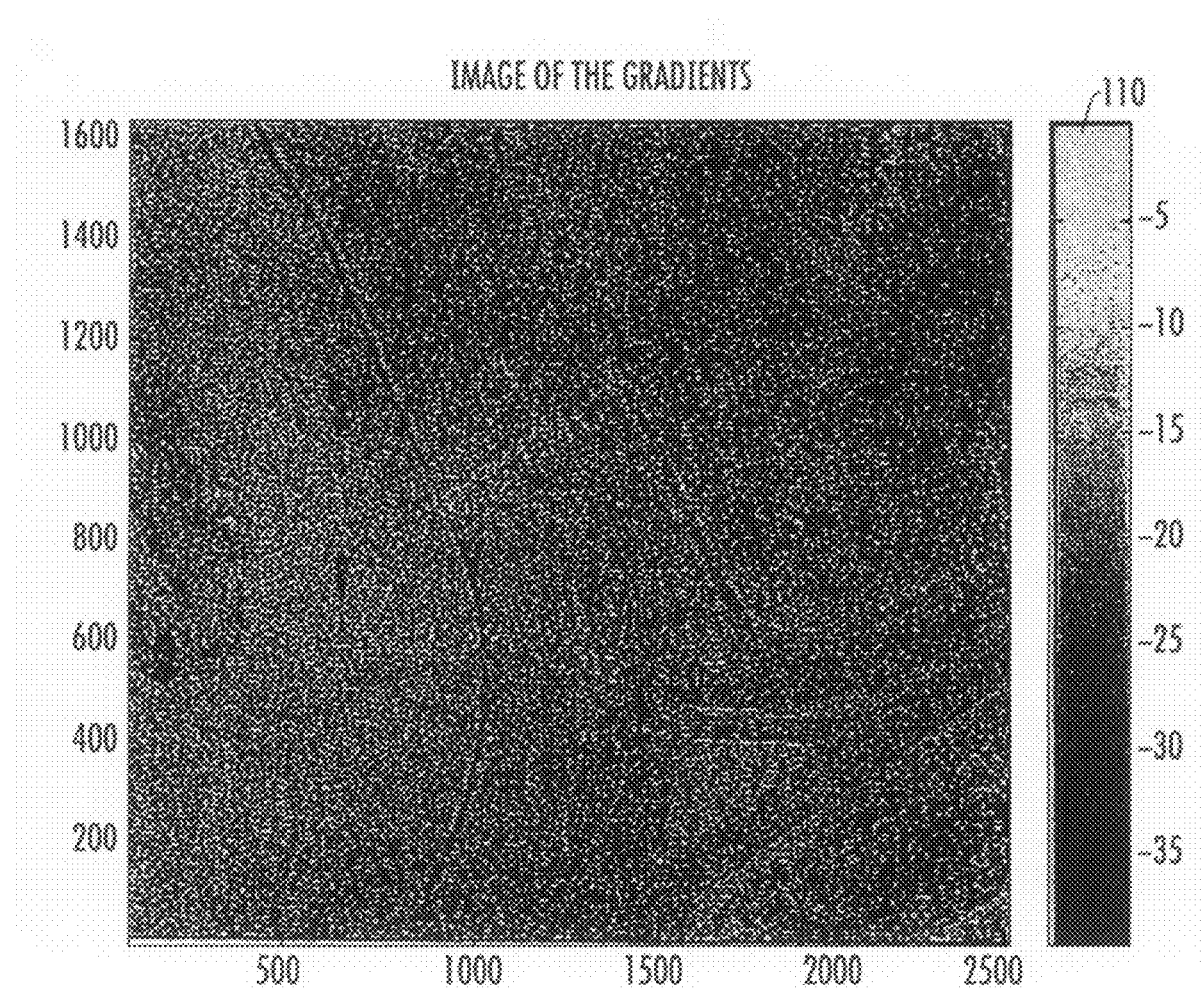
FIG. 5 is an image of the gradients corresponding to the plots shown in FIGS. 2 and 3.

The distribution of pixels intensities and gradient values in FIGS. 2 and 3 correspond to the image shown in FIG. 4, and to the image of the gradients shown in FIG. 5. The two images are very similar. Each image includes a dB scale 110 representing the amount of brightness for viewing the image.

Figure 6:
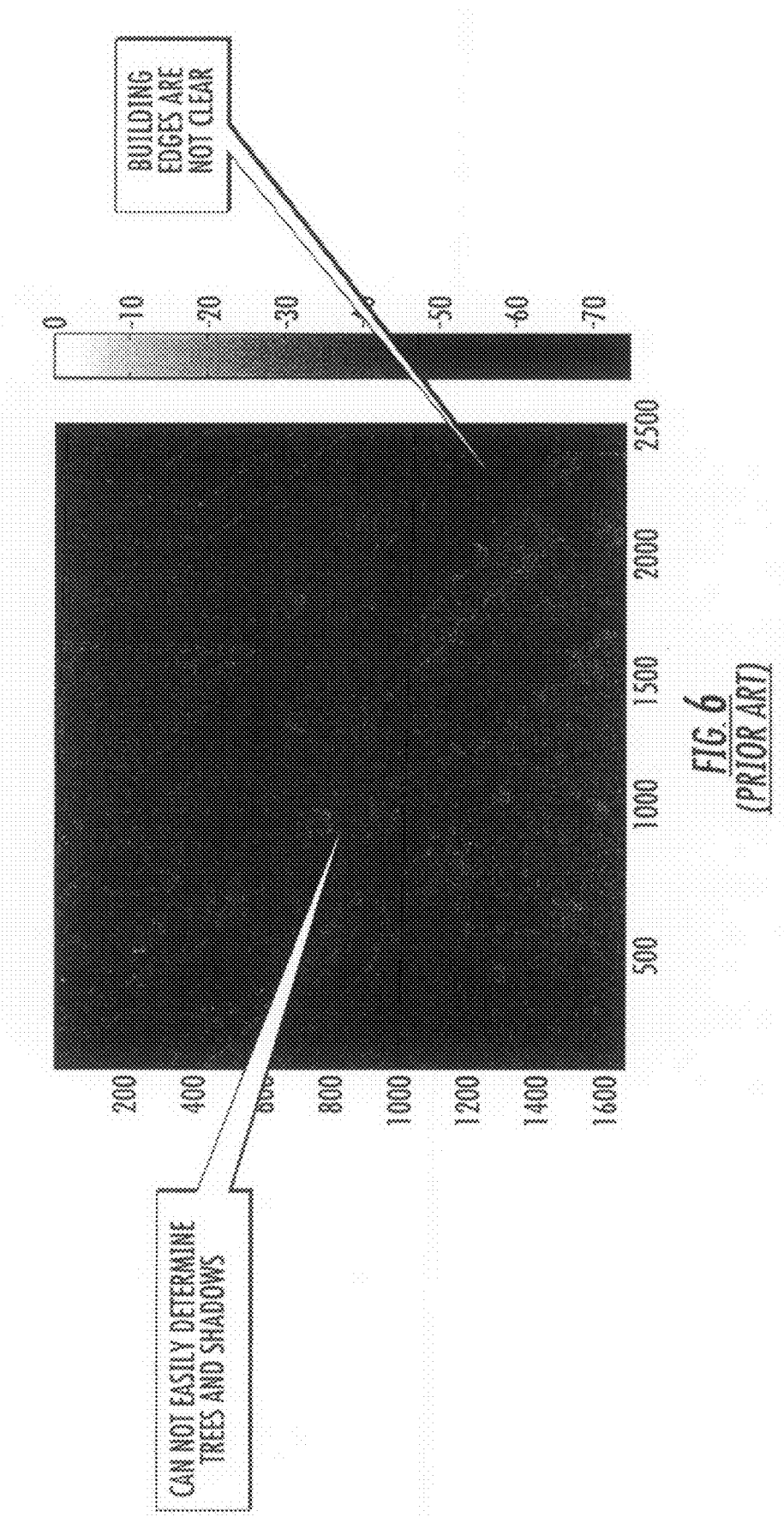
FIG. 6 is an image of gradients enhanced with a weighting scheme in accordance with the prior art.

For the image of gradients displayed in FIG. 6, a conventional weighting scheme, such as Taylor weighting for example, has been applied during processing of the SAR data set. The illustrated captions point out that the building edges are not clear, nor can the trees and shadows be easily determined.

Figure 7:
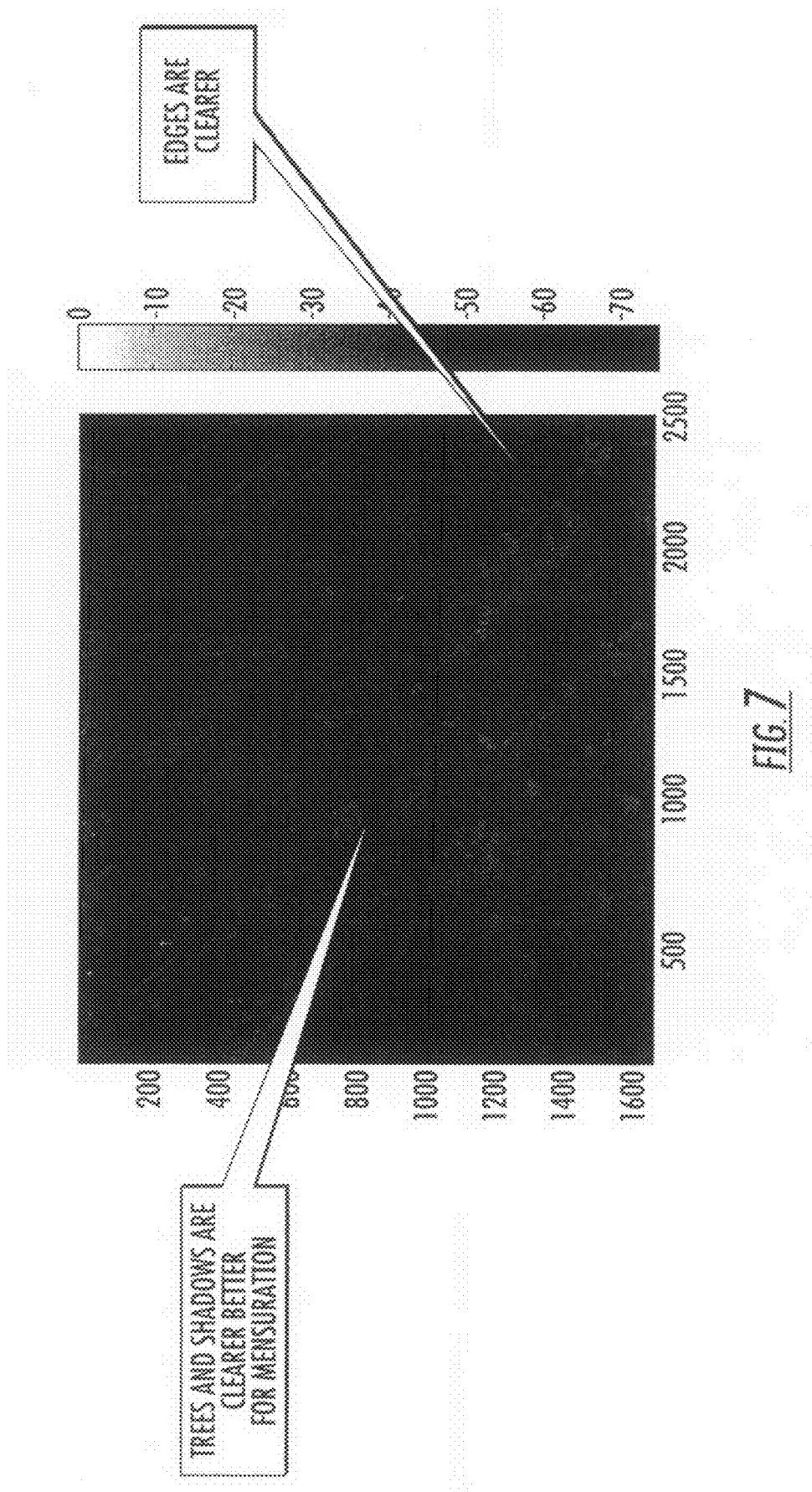
FIG. 7 is the same image of gradients shown in FIG. 6 enhanced with an anisotropic diffusion algorithm in accordance with the present invention.

In FIG. 7, the noise threshold k for the SAR data set has been set based upon a statistical analysis of distribution of the gradient values, as discussed above. The tailored filtering, which may also be referred to as a smart filter, better matches the SAR data being processed by adjusting where the smoothing is to be performed. As a result, the illustrated captions point out that the building edges are clearer, and the trees and shadows are clearer which is advantageous for better mensuration.

Comparisons of the same scene using different filtering schemes will now be discussed in reference to FIGS. 8-12. The various scatterers of interest are circled in each figure. The original scene before any filtering is shown in FIG. 8. In FIG. 9, filtering of the original scene is based on a grid window of 9. Each group of 3×3 pixels is averaged, and this is repeated for all the pixels in the SAR data set. A standard Gaussian filter has been applied to the original scene as shown in FIG. 10, and a standard anisotropic diffusion algorithm has been applied to the original scene as shown in FIG. 11.

To better remove the noise around the scatterers in the original scene, while leaving the components of the scatterers intact, the noise in the SAR data set is first determined. Based upon the selected noise threshold k, the anisotropic diffusion algorithm is adjusted accordingly to provide a higher resolution image, as shown in FIG. 12.

Even though an anisotropic diffusion algorithm has been applied to the scene in FIG. 11, the scatterers still have what is known as multi-bounce around them. With multi-bounce, the waves hit the scatterers and interface with the ground, and as a result, bounce all around the scatterers. The multi-bounce looks like noise, but in some situations, can disclose helpful information about the scatterers. In FIG. 12, the convection function c has been selected so that the multi-bounce has been removed.

The advantage of selectively controlling the convection function c based on a statistical analysis of the distribution of gradient values for the SAR data set being processed provides increased resolution. Intra-region smoothing and edge preservation is provided for images corrupted by additive noise. In cases where the SAR data sets contains speckle, the anisotropic diffusion algorithm with the adjustable convection function c produces edge-sensitive speckle reduction.

The selectively controlled convection function c can advantageously be applied on raw complex data (i.e., real and imaginary components) and detected images (i.e., only real components) using hardware and/or software to improve the overall fidelity of the SAR data set. This can also be done autonomously based upon selection of the noise threshold for the SAR data sets being processed. High resolution EO like scenes can thus be created from SAR data sets. By simultaneously removing noise and smoothing similar data areas in the SAR data set, high frequency data is preserved. Consequently, information texture and linear structures are preserved which provides a more accurate assessment between EO and SAR data.

Another aspect of the invention is directed to a complex anisotropic diffusion algorithm. The equations for the anisotropic diffusion algorithm as discussed above have been re-derived for complex data so that the process is now non-linear. In terms of complex data, the real and imaginary components of a SAR data set are processed at a same time.

In contrast, even though anisotropic diffusion algorithms have been applied to complex SAR data, it has been done so in a linear fashion. This means that the real and imaginary components of the complex SAR data are processed separately, and then the results are combined together.

The re-derived equations for the complex anisotropic diffusion algorithm are as follows:

$$div(g(\nabla I)\nabla I) = \frac{\partial}{\partial x}\left\{\left(\frac{\partial}{\partial x}\right)\frac{K^2}{K^2+\left(\frac{\partial a}{\partial x}\right)^2+\left(\frac{\partial b}{\partial x}\right)^2+\left(\frac{\partial a}{\partial y}\right)^2+\left(\frac{\partial b}{\partial y}\right)^2}\right\}+ \quad (3)$$

$$z\frac{\partial}{\partial x}\left\{\left(\frac{\partial b}{\partial x}\right)\frac{K^2}{K^2+\left(\frac{\partial a}{\partial x}\right)^2+\left(\frac{\partial b}{\partial x}\right)^2+\left(\frac{\partial a}{\partial y}\right)^2+\left(\frac{\partial b}{\partial y}\right)^2}\right\}=$$

$$\frac{\partial^2 a}{\partial x^2}\left(\frac{K^2}{K^2+\left(\frac{\partial a}{\partial x}\right)^2+\left(\frac{\partial b}{\partial x}\right)^2+\left(\frac{\partial a}{\partial y}\right)^2+\left(\frac{\partial b}{\partial y}\right)^2}\right)+$$

-continued $$\frac{\partial a}{\partial x} \left( \frac{-K^2 \left( 2\left(\frac{\partial a}{\partial x}\right)\left(\frac{\partial^2 a}{\partial x^2}\right) + 2\left(\frac{\partial b}{\partial x}\right)\left(\frac{\partial^2 b}{\partial x^2}\right) + \right)}{2\left(\frac{\partial a}{\partial y}\right)\left(\frac{\partial^2 a}{\partial x \partial y}\right) + 2\left(\frac{\partial b}{\partial y}\right)\left(\frac{\partial^2 b}{\partial x \partial y}\right)} \right) +$$

$$z \left( \frac{\partial^2 b}{\partial x^2} \left( \frac{K^2}{K^2 + \left(\frac{\partial a}{\partial x}\right)^2 + \left(\frac{\partial b}{\partial x}\right)^2 +} \right) + \left(\frac{\partial a}{\partial y}\right)^2 + \left(\frac{\partial b}{\partial y}\right)^2 \right)$$

$$\frac{\partial b}{\partial x} \left( \frac{-K^2 \left( 2\left(\frac{\partial a}{\partial x}\right)\left(\frac{\partial^2 a}{\partial x^2}\right) + 2\left(\frac{\partial b}{\partial x}\right)\left(\frac{\partial^2 b}{\partial x^2}\right) + \right)}{2\left(\frac{\partial a}{\partial y}\right)\left(\frac{\partial^2 a}{\partial x \partial y}\right) + 2\left(\frac{\partial b}{\partial y}\right)\left(\frac{\partial^2 b}{\partial x \partial y}\right)} \right)$$

Since the real and imaginary components of the SAR data set are being treated as a complex object, the complex anisotropic diffusion algorithm is able to pull out scene content from extremely noisy data, which in turn improves the resolution of the viewed image.

Figure 13:
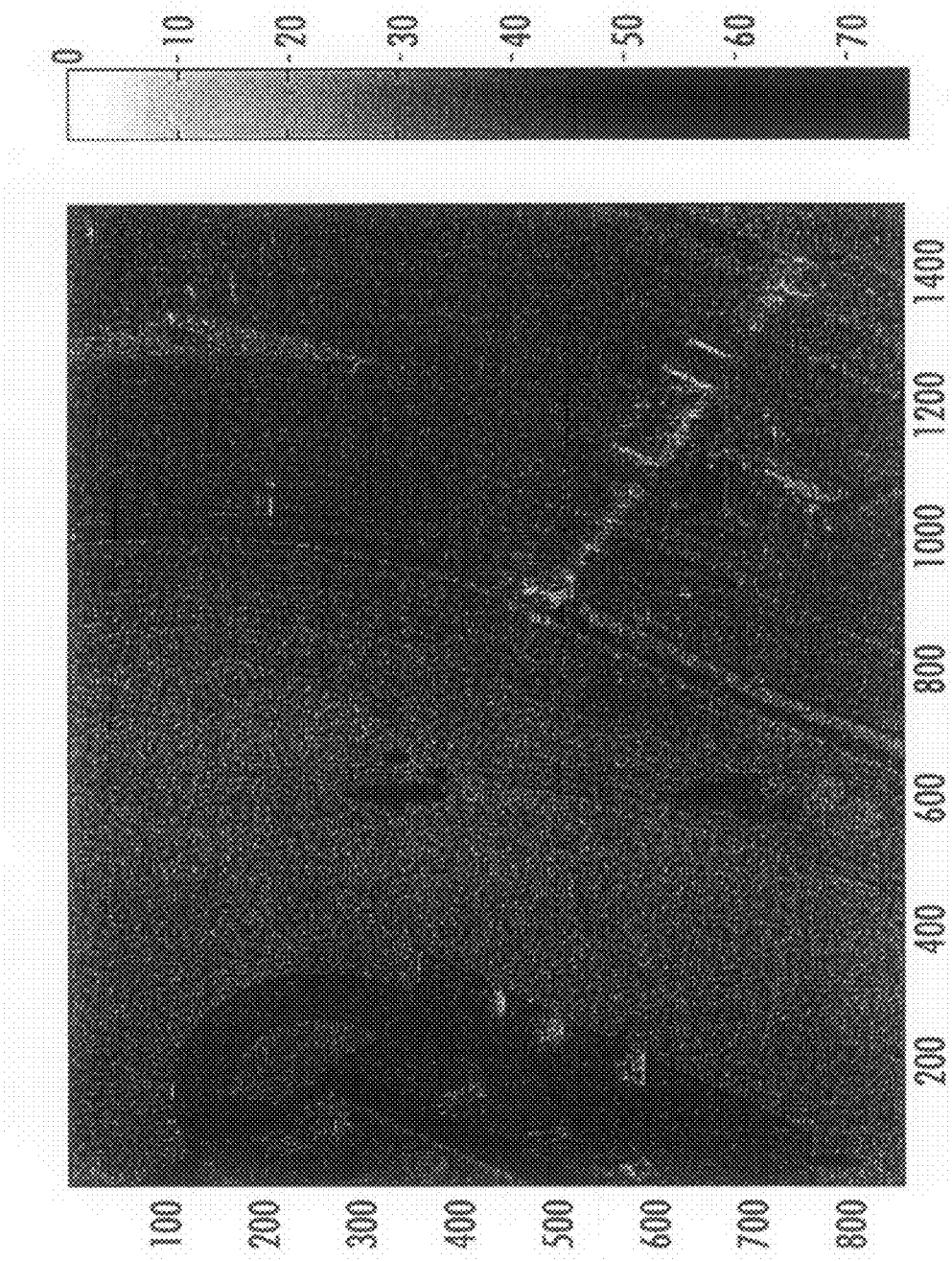
FIG. 13 is an original image before filtering in accordance with the present invention.
Figure 14:
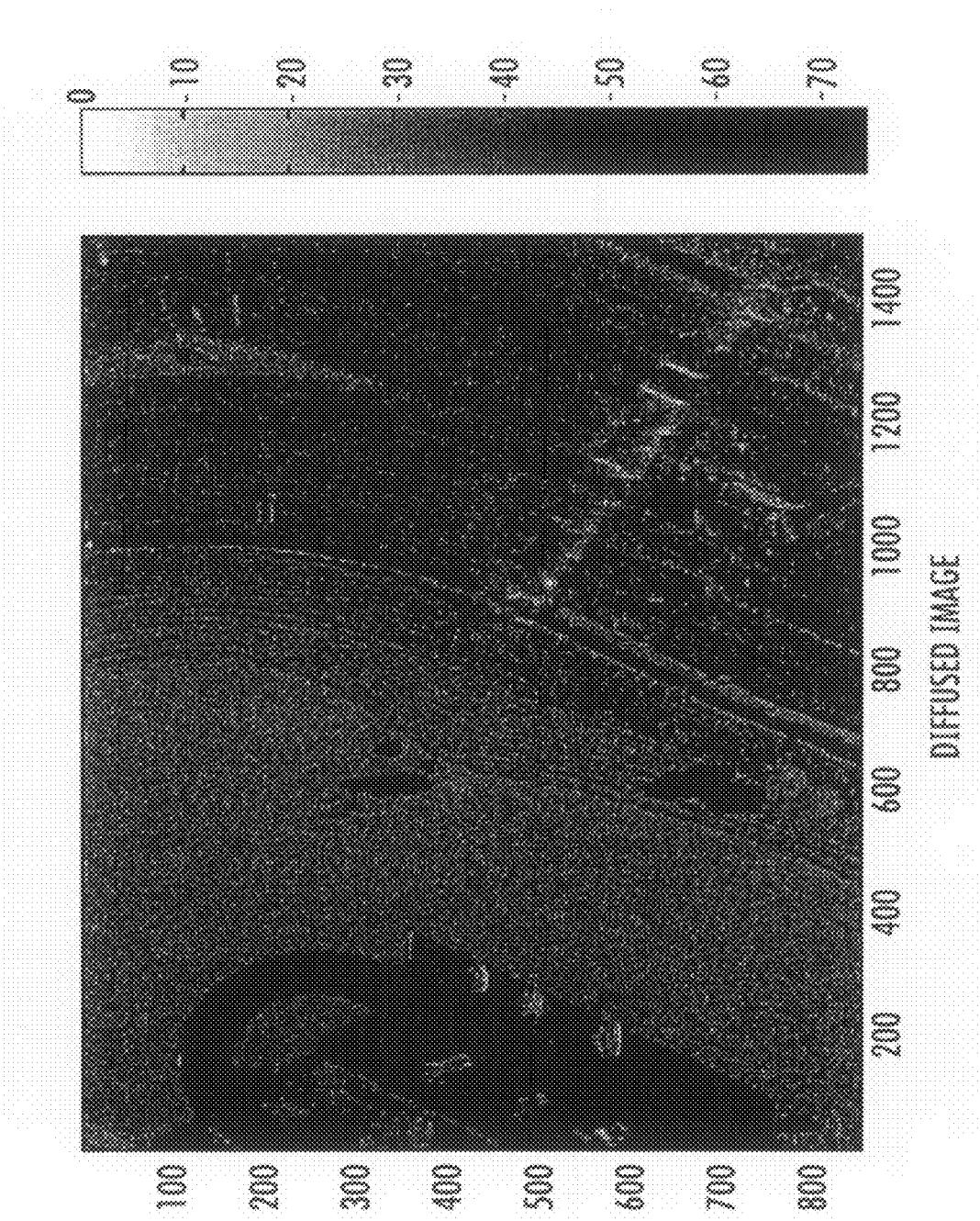
FIG. 14 is an image corresponding to the original image shown in FIG. 13 after filtering with a complex anisotropic diffusion algorithm in accordance with the present invention.

As a comparison, reference is directed to the original image shown in FIG. 13. Complex anisotropic diffusion is applied to the SAR data set corresponding to the original SAR image in FIG. 13 to provide the diffused image shown in FIG. 14. The boundaries and features are noticeably sharper in the diffused image.

In addition to the complex anisotropic diffusion algorithm being applied to single image SAR data sets, it may also be applied to interferometric processing. In particular, interferometric processing for subsidence measurement for urban scene is particularly beneficial when using the complex anisotropic diffusion algorithm.

Interferometric processing of SAR data will now be discussed in greater detail. Referring to the flowchart in FIG. 15, interferometric processing of SAR data for subsidence measurements in urban areas will be discussed as an illustrated example. Subsidence is a terrain displacement in which the elevation of the earth's surface is decreasing relative to sea level.

SAR images are received at a trim phase history Block 120. For purposes of discussion, two SAR images are being compared. The two SAR images are of the same scene but the images are slightly offset from one another, as readily appreciated by those skilled in the art. If the SAR images are received as raw data, they are converted from frequency space to image space. Frequency space corresponds to phase and power, whereas image space corresponds to phase and amplitude. The phase and amplitude for each pixel in the SAR image provide the real and imaginary components for the complex SAR data to be processed.

The trim phase history Block 120 makes sure at a very high level that the two SAR images are suitable for interferometric processing. The intersection of the respective phase histories in frequency space is selected between the two SAR images, and everything else is discarded. The two SAR images are registered in Block 122. Registration makes sure that features between the two SAR images are aligned. For example, a corner of a building at a given latitude/longitude/height in the first SAR image is registered to correspond to a same latitude/longitude/height in the second SAR image. As a result, the pixels are lined up between the two SAR images.

The interferogram is formed in Block 124. The first SAR image is multiplied by the complex conjugate of the second SAR image. The result is a difference in phase between the two SAR images. The resulting interferogram is directly related to height. In the interferogram, the phase for each pixel is obtained by taking the arctan of its imaginary part divided by its real part. For the first SAR image, the phase data for each pixel is determined. Likewise, the phase data for each pixel is determined for the second SAR image. As will be discussed in detail below, the phase data for each pixel varies of the interferogram between minus pi and plus pi. Consequently, the phases wrap around.

Next, a low pass filter would normally be applied to smooth the interferogram. However, this has a tendency to blur the edges in the scene. For a rural scene blurring is acceptable, but for an urban scene in which subsidence is being measured at specific landmarks, blurring is not desirable since this effects the accuracy of the measured subsidence.

In lieu of a low pass filter, a complex anisotropic diffusion algorithm as discussed above is applied in Block 126 and a shock filter is applied in Block 128. With the complex anisotropic diffusion algorithm, the real and imaginary parts of each pixel are processed as a complex object, i.e., non-linear processing. In contrast, linear processing involves separately processing the real and imaginary parts and then combining the results together. The complex anisotropic diffusion algorithm locally mitigates noise while at the same time preserving scene discontinuities in the interferogram.

The shock filter is used for image deblurring as readily understood by those skilled in the art. In other words, the boundaries in the scene are enhanced using mathematical morphology. The equation corresponding to the shock filter is as follows:

$$\frac{\partial u(x, y, t)}{\partial t} = -\text{sign}(\nabla^2 u(x, y, t)) \|\nabla u(x, y, t)\| \quad (4)$$

Figure 16:
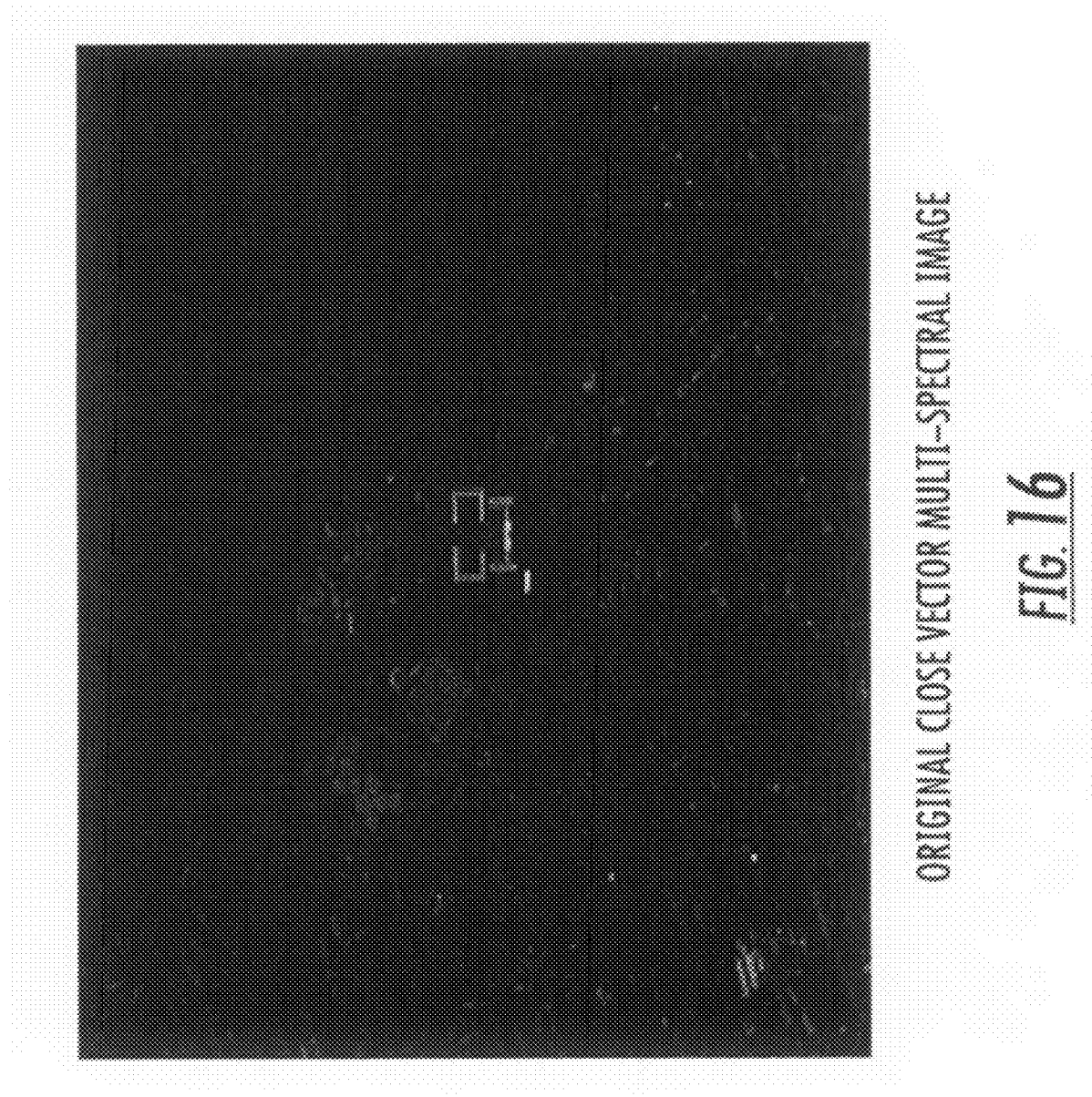
FIG. 16 is an original close vector multi-spectral image before application of a shock filter in accordance with the present invention.
Figure 17:
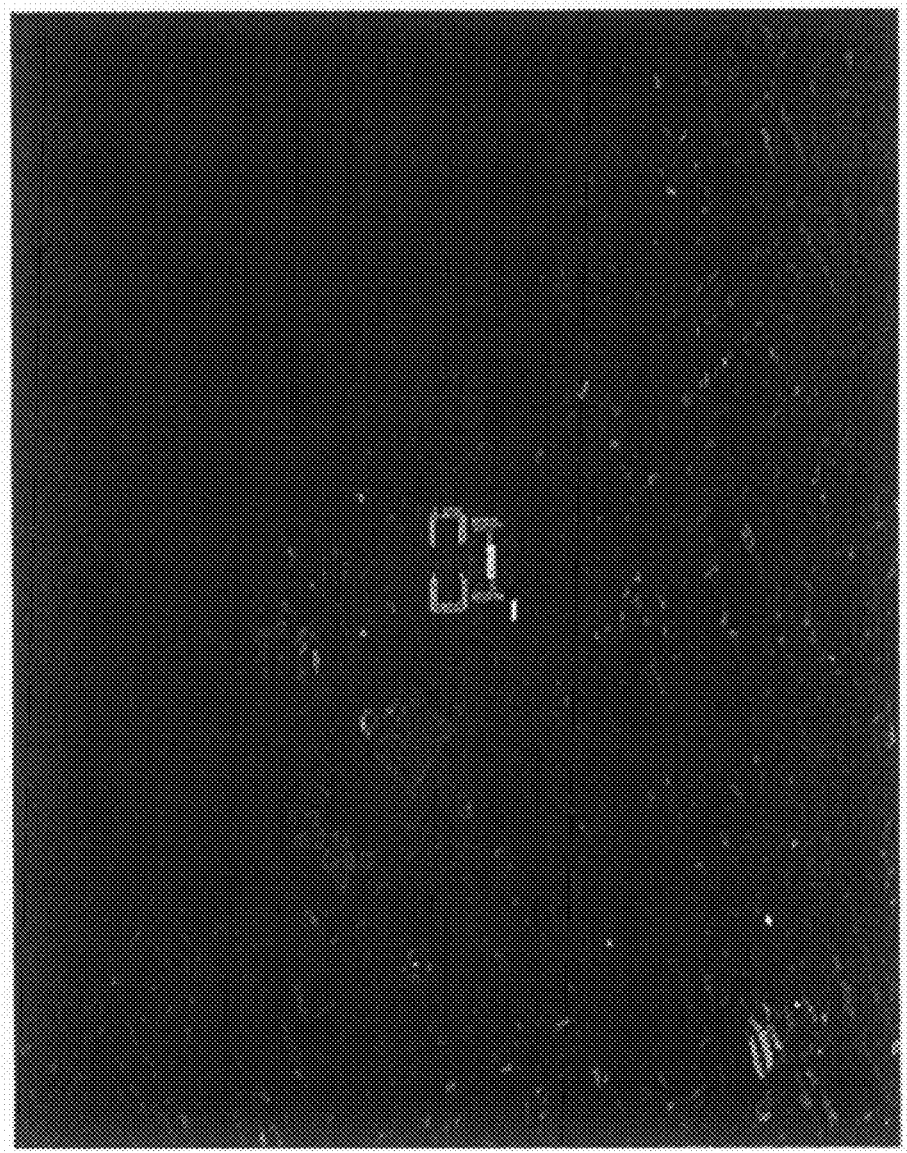
FIG. 17 is an image corresponding to the original image shown in FIG. 16 after application of the shock filter in accordance with the present invention.

The shock equation is a non-linear hyperbolic differential equation. The first part of the equation corresponds to the erosion/dilation that is determined by the Laplacian. The second part of the equation is a magnitude of the gradient. To illustrate application of the shock filter, an original close vector multi-spectral image is shown in FIG. 16, and application of the shock filter to the image is shown in FIG. 17. The boundaries are noticeable sharper after application of the shock filter.

The non-linear smoothing via the complex anisotropic algorithm and the boundary enhancement via the shock filter increases the accuracy and quality of the phase difference measurement. Since subsidence is measured using persistent objects in the scene (i.e., buildings) as reference points, improving boundary quality of the persistent objects improves the subsidence measurement.

Since the phase can only vary between plus pi to minus pi, it is called a wrapped phase. If there is no ambiguity wrap in the phases between the two SAR images, the subsidence can then be measured in Block 130. However, if an ambiguity wrap does exist, as is typically the case, then a variational phase unwrap is performed in Block 132.

The variational phase unwrap is applied to the interferogram, which is the phase difference between the registered first and second SAR images. The phase difference between the two registered SAR images is related to a desired physical quantity of interest, such as surface topography. The phase difference can be registered only modulo $2\pi$, and current interferometric techniques mainly recover the absolute phase (the unwrapped phase) from the registered one (wrapped phase) using discrete values. Current phase unwrapping may be performed by residue-cut tree algorithms and least-square algorithms, for example.

To perform phase unwrapping, the phase is determined from the interferogram, which is a complex object with real and imagery parts. The arctan of the imaginary part over the real part provides the respective phases. The amplitude is discarded and the phase is left.

Since the phase can only vary between plus pi to minus pi, it is called a wrapped phase. In reality, however, the phase goes from plus infinity to minus infinity. This is where the difficulties lie in the interferometric process.

The goal is to determine the proper mapping to go from plus/minus pi space to plus/minus infinity space. However, the finite images are limited by the height of the tallest object in the scene. If the tallest building is 800 feet, then the difference is based on the level at ground and 800 feet. In theory, plus/minus infinity is mathematically correct, but realistically the variation is between zero and the height of the tallest object in the scene.

The variational phase unwrap deals with non-linearities and discontinuities in the data. Ambiguity exists at the phase wraps at the plus/minus pi boundaries before taking the phase difference between the two SAR images. The point at which the phase wraps is known as the fringe lines.

The variational phase unwrapping algorithm is two-dimensional. One-dimensional phase unwrapping techniques can be re-derived for two-dimensions using requirements that apply specifically to the subsidence problem. Other two-dimensional phase unwrapping techniques that are available can also be tailored.

In image analysis, segmentation is the partitioning of a digital image into multiple regions (sets of pixels) according to some criterion. The goal of segmentation is typically to locate objects of interest. Some common techniques for segmentation include thresholding, region-growing and connect-component labeling. Active contours is also a common method.

The variational phase unwrapping algorithm is based on the Mumford-Shah function or cost function, as provided below:

$$E(f, \vec{C}) = \beta \int_\Omega (f - g)^2 dA + \alpha \int_{\Omega \setminus \vec{C}} |\nabla f|^2 dA + \gamma \oint_{\vec{C}} ds \quad (5)$$

$$\beta \int_\Omega (f - g)^2 dA$$

$$\int_{\Omega \setminus \vec{C}} |\nabla f|^2 dA$$

$$\gamma \oint_{\vec{C}} ds$$

The equation determines what f and C will provide the unwrapped phase. The first term is the f piece-wise smooth approximation to g (the image) with discontinuities along C. This part of the equation may be thought of as a data fidelity term measuring the quality of f. The second term of the equation is the smoothness term. This may be viewed as the prior model for f given C. The third term corresponds to the length of C. Normally there is a penalty for excessive arc length. The original Mumford-Shah function or cost function used the Hausdorff measure for more general sets of discontinuities. In accordance with the present invention, C is restricted to be a smooth curve in order to be replaced by the arc length.

To minimize the Mumford-Shah function or cost function, a new cost function is developed to better address the discontinuity of data between the fringe lines. The new cost function is as follows:

$$E(f, \vec{C}) = \quad (6)$$

$$\beta \int_\Omega (f_x - g_x)^2 dA + \beta \int_\Omega (f_y - g_y)^2 dA + \alpha \int_{\Omega \setminus \vec{C}} |\nabla f|^2 dA + \gamma \oint_{\vec{C}} ds$$

The first term expresses the gradients between the wrapped and unwrapped phase. The second term expresses prior knowledge of the scene to be processed. The third term imposes limits on the maximum fringe length of the unprocessed interferogram. Most phase unwrapping algorithms work on smooth data. After determining the minimal solution for the cost function E(f,C), a conversion is made to a partial differential equation (PDE). The PDE is then solved.

The variational phase unwrapping algorithm takes advantage of the fact that the data is preprocessed with the complex anisotropic diffusion algorithm. The complex anisotropic diffusion algorithm is designed not to smooth discontinuities. Consequently, the variational approach to the phase unwrapping takes advantage that the data will still be discontinuous.

Figures 18A, 18B:
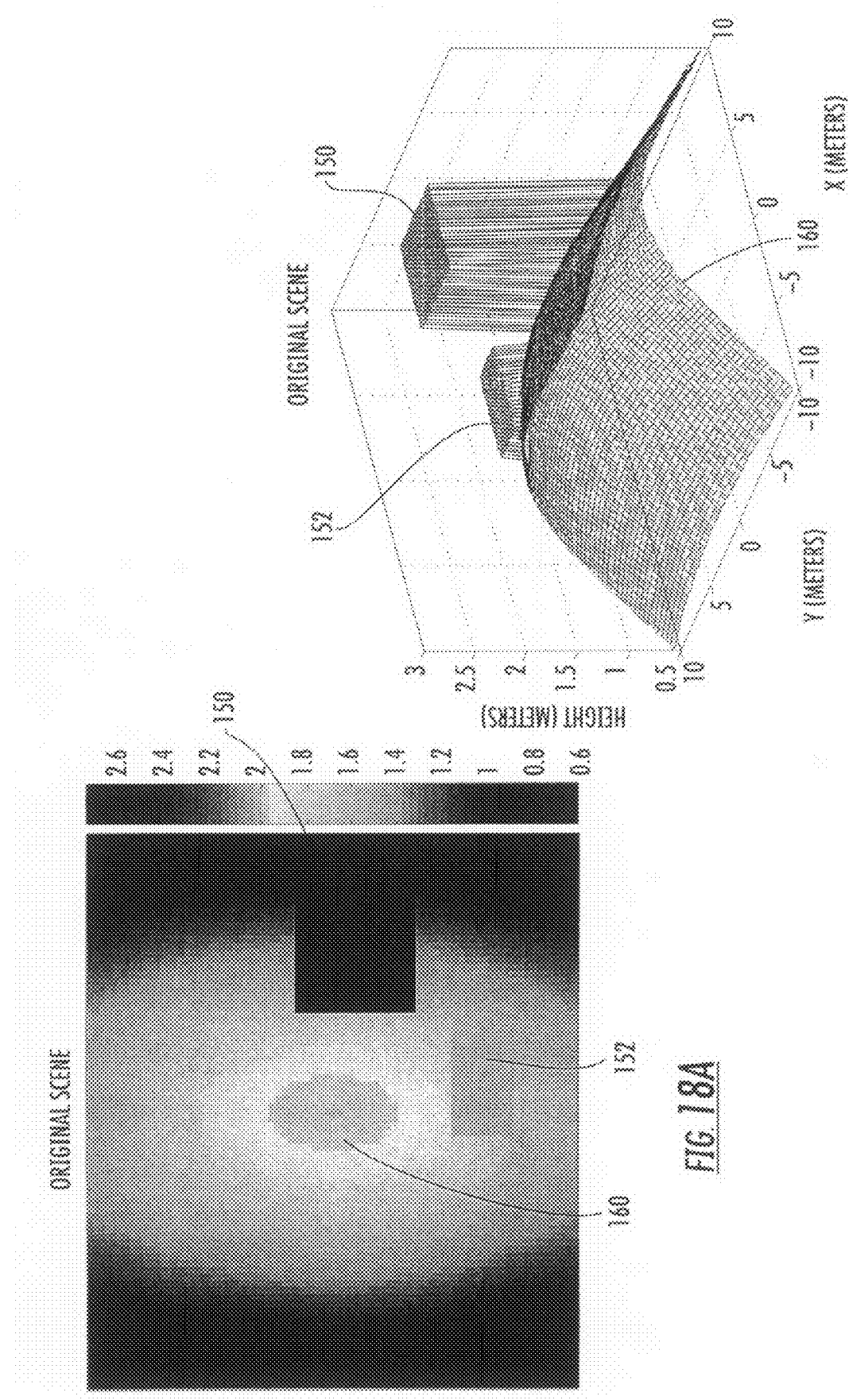
FIGS. 18A and 18B are two-dimensional and three-dimensional images of an original scene before interferometric processing in accordance with the present invention.

Variational phase unwrapping will now be discussed in reference to the plots shown in FIGS. 18-27. An original scene of two buildings 150, 152 and the corresponding ground 160 adjacent to the buildings is provided in FIGS. 18A and 18B. FIG. 18B is a three-dimensional plot of the SAR image, and FIG. 18A is a top down view of the same SAR image. In the original scene, the ground 160 is a hill that is nearly as tall as one of the buildings 152.

A wrapped interferogram of the original scene is provided in FIGS. 19A and 19B. Since the interferogram is a complex object, its phase is determined so that the interferogram can be viewed. Consequently, the axis of the plot in FIG. 19B is in radians. For each x and y pixel there is a phase value, which is wrapped. This means that the range is always between plus/minus pi. The edges of the plus/minus pi range are the fringe lines 170 and 172.

In FIG. 19B, the center of the hill 160 has dropped. The phase difference does not include any noise. Noise is artificially added to the scene to simulate a real collection, as shown in FIGS. 20A and 20B. In FIGS. 21A and 21B, the noise has been mitigated with the application of a smoothing filter. Since normal smoothing algorithms have a tendency to smooth discontinuities, the fringe lines 170, 172 have been smoothed. As a result, the resolution has been reduced. A complex anisotropic diffuser interferogram is provided in FIGS. 22A and 22B. The fringe lines 170, 172 are sharper, and the building edges are preserved.

Figure 24:
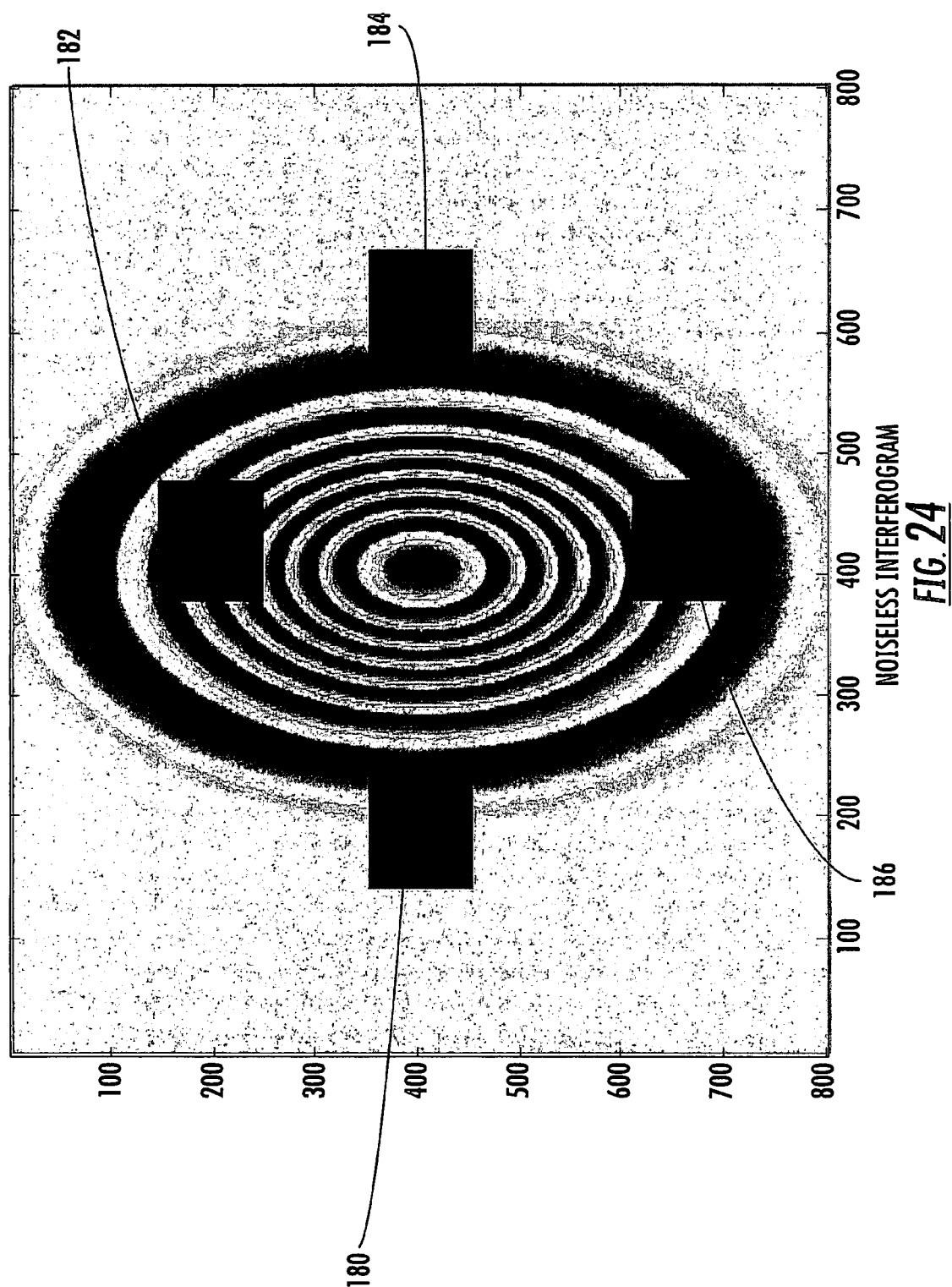
FIGS. 24-27 are top down two-dimensional images corresponding to the original scene shown in FIG. 23 illustrating various stages of application of interferometric SAR processing in accordance with the present invention.
Figure 25:
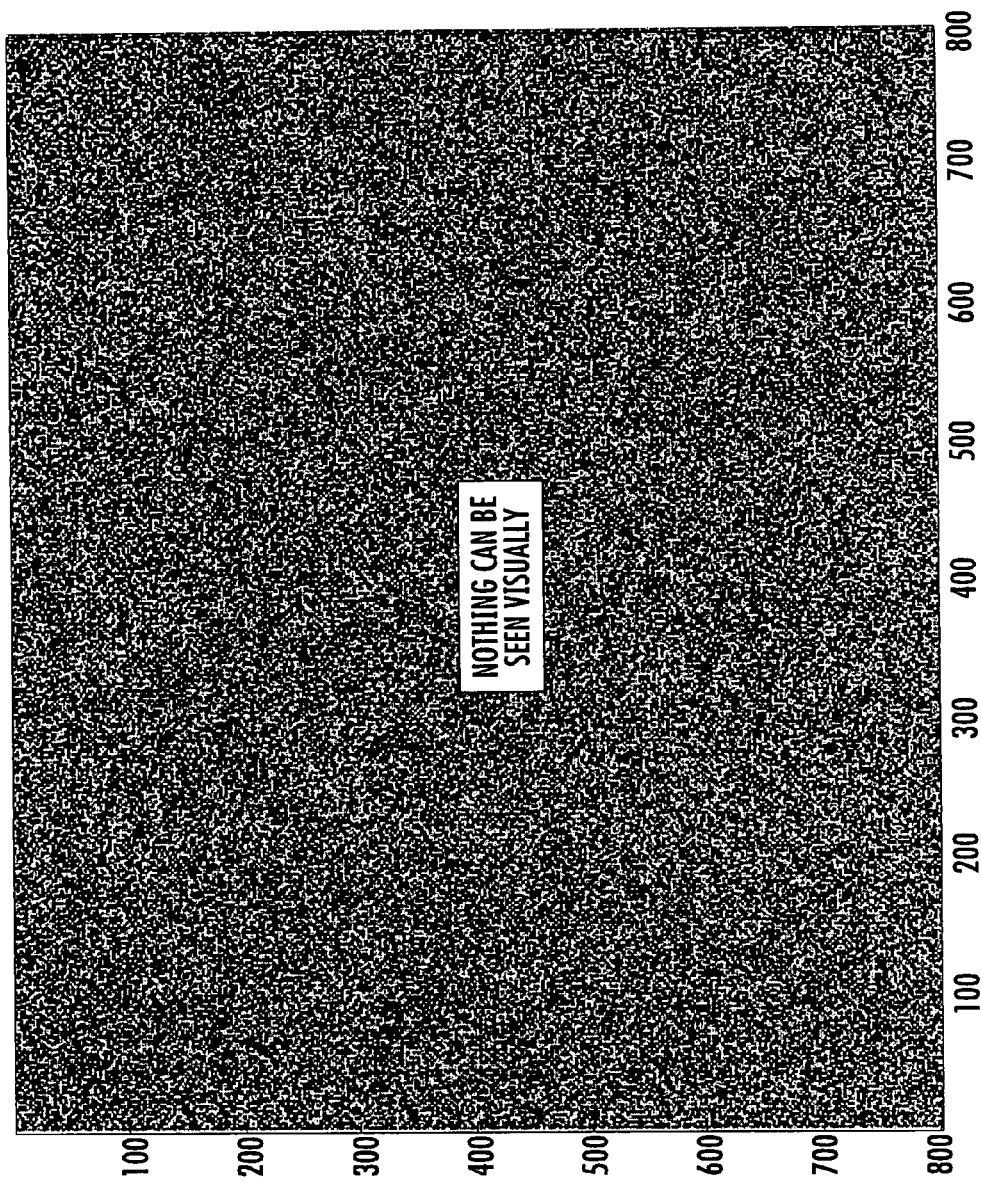
Figure 26:
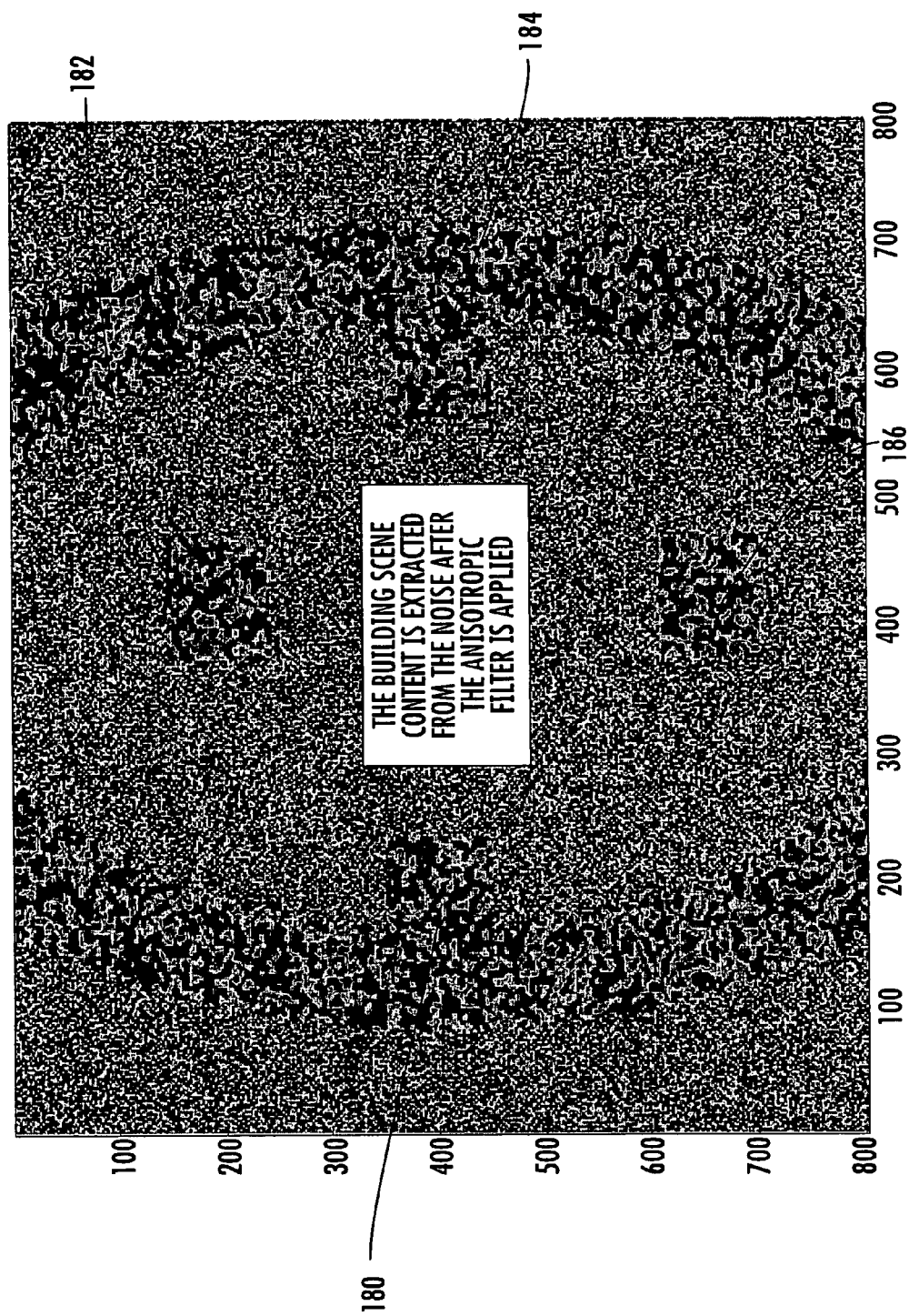
Figure 27:
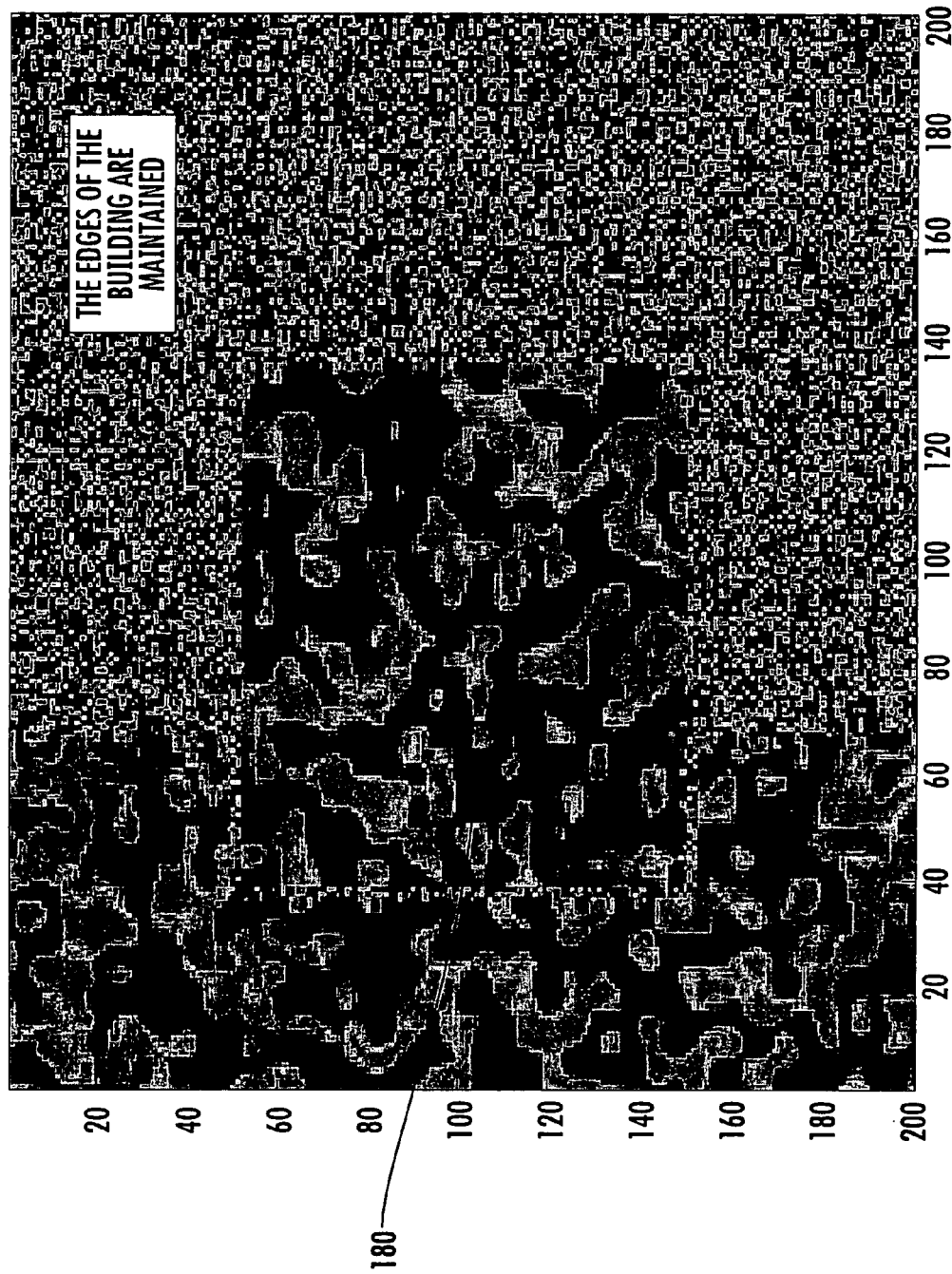

Another set of examples will now be discussed in reference to FIGS. 23-27. A top down view of four buildings 180, 182, 184 and 186 is shown in FIG. 23. Each building is at a different height as indicated by a different shade. A noiseless interferogram is shown in FIG. 24. Because of the phase wrapping between plus/minus pi, the four buildings 180, 182, 184 and 186 look to be the same height as indicated by the same shade. When noise is added to the interferogram, the buildings 180, 182, 184 and 186 become hidden by the noise, as shown in FIG. 25. A complex anisotropically diffused noisy interferogram in accordance with the invention is shown in FIG. 26. The buildings 180, 182, 184 and 186 are extracted from the noise after the application of the complex anisotropic diffusion algorithm. A close-up view of building 180 is provided in FIG. 27 to illustrate how the boundary edges are maintained.

Figure 15:
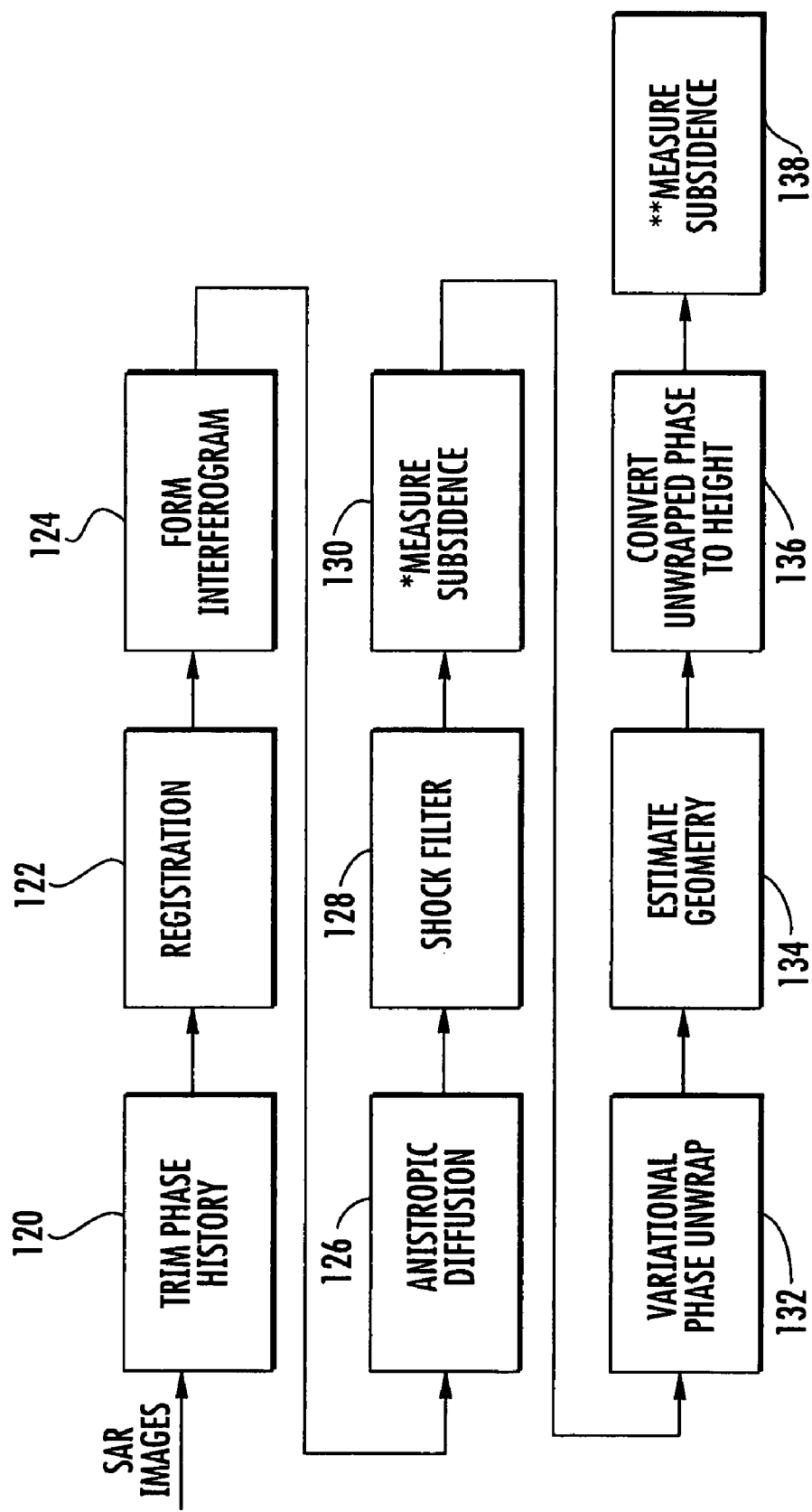
FIG. 15 is a flow chart illustrating non-linear processing of interferometric SAR data for subsidence measurements in accordance with the present invention.

Referring back to the flowchart in FIG. 15, the geometry of each SAR providing a respective SAR image is estimated in Block 134. A determination is made as to where each SAR was located at the time the corresponding image was taken. If the first SAR was pointing at a given latitude/longitude/height, then there will be a high confidence in the pixel values as far as what the latitude/longitude/height is for that pixel.

Figure 29:
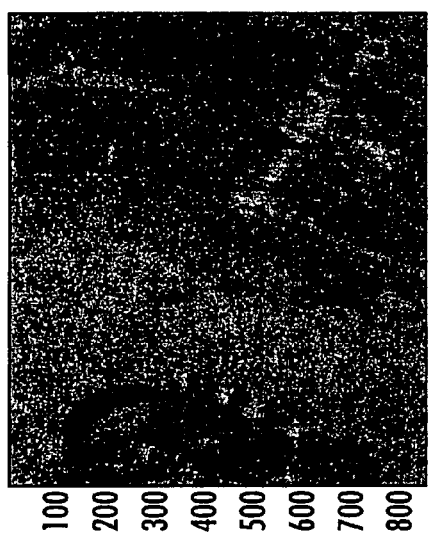
FIG. 29 is an image corresponding to the original image shown in FIG. 28 after application of a Gaussian filter in accordance with the prior art.
Figure 30:
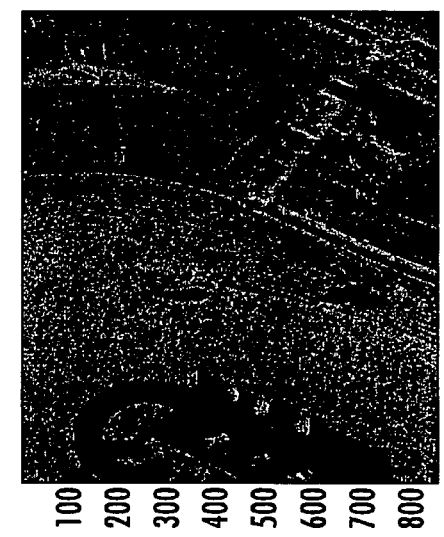
FIG. 30 is an image corresponding to the original image shown in FIG. 28 after multiple iterations of filtering with a complex anisotropic diffusion algorithm in accordance with the present invention.
Figure 28:
FIG. 28 is an original image before filtering in accordance with the present invention.

The unwrapped phase in radians is converted to height in Block 136. When an unwrapped phase measurement is obtained it is in radians. A conversion is then made from radians to height. A closed form equation takes the radian value to height as readily understood by those skilled in the art. The height provides the necessary measurement to determine subsidence between the two SAR images. For illustration purposes, an original image is shown in FIG. 28, the original image smoothed with a Gaussian filter is shown in FIG. 29, and the original image filtered with a complex anisotropic diffusion algorithm after 20 iterations is shown in FIG. 30. Between the two images, the boundary edges are noticeably crisper in FIG. 30.

The discontinuity is thus maintained by the anisotropic diffusion algorithm because of the properties of the algorithm. The algorithm basically operates on the gradients so it knows based strictly on the gradient of the image whether or not to smooth. If the gradient is below the noise threshold that is set up front, the algorithm is going to go ahead and smooth the gradient. If the gradient is above the threshold, the algorithm will not smooth the gradient in order to maintain or preserve an edge of a corresponding structure. As noted above, the threshold is preferably set based on knowledge of the scene.

The variational phase unwrapping is derived from the error mathematics called variational calculus. The principles of variational calculus are used to come up with a phase unwrapping algorithm that deals with discontinuities. Current unwrapping algorithms have a tendency to smooth the data. In contrast, the variational phase unwrapping algorithm is based on a cost function for controlling the smoothing. Instead of providing a global smoothing based on the properties of the data, the variational phase unwrapping algorithm leaves edges intact and selectively smoothes the area adjacent the edges.

Another aspect of the invention is application of the anisotropic diffusion algorithm when compressing and decompressing SAR images. SAR data sets can be relatively large, and when a SAR data set is compressed, the resolution is usually lowered during the process. This is a result of lossy preprocessing compression schemes. Lossy preprocessing algorithms usually degrade the scatterers in a scene. Moreover, the volume of data can overwhelm current processing capabilities.

Most common preprocessing algorithms act as low-pass filters. The following compression schemes attempt to group the data in a way that finds similarities throughout the data: independent component analysis (ICA), wavelet transform (Gabor filters) and parallelism exploitation schemes. Due to the dynamic range of the SAR data, it is difficult to threshold the data in a way such that the data can be grouped well.

A computer-implemented method for compressing SAR images comprises receiving a SAR image to be compressed, applying an anisotropic diffusion algorithm to the SAR image, and compressing the SAR image after applying the anisotropic diffusion algorithm thereto. An advantage of applying the anisotropic diffusion algorithm is that the size of the SAR image after compression results in a smaller size file, regardless of the compression scheme used. Consequently, storage and transmission of the compressed SAR image occupies less space and bandwidth.

For comparison purposes, the metrics for compression are based on the original scene shown in FIG. 31. The original scene has an uncompressed Tiff file size of 691 kB. JPEG compression of the original scene reduces the file size to 62 kB, whereas Winzip compression of the original scene reduces the file size to 41 kB.

Filtering of the original scene with a Gaussian filter is shown in FIG. 32. JPEG compression of the Gaussian filtered original image reduces the file size to 55 kB, whereas Winzip compresses of the Gaussian filtered original image reduces the file size to 33 kB.

In accordance with the present invention, filtering of the original scene an anisotropic diffusion algorithm is shown in FIG. 33. The size of the anisotropic diffused filtered scene is still the same size as the original scene without filtering and with Gaussian filtering. JPEG compression of the anisotropically diffused scene reduces the file size to 44 kB, whereas Winzip compression of the anisotropically diffused scene reduces the file size to 23 kB.

TABLE 1 provides a side-by-side comparison between the different images. When anisotropic diffusion has been applied to any of the SAR images, greater compression can be achieved than when the anisotropic diffusion algorithm was not applied. The anisotropic diffusion filtered image has a JPEG compression of 16:1 and a Winzip compression ratio of 30:1.

TABLE 1

Compression Ratio Table

| Image Type | Uncompressed Tiff | JPEG Compression | Winzip |
|---|---|---|---|
| Original Image | 1 | 11:1 | 16:1 |
| Gaussian Filtered | 1 | 13:1 | 21:1 |
| Anisotropic Filtered | 1 | 16:1 | 30:1 |

In terms of decompression, decompression is performed based on anisotropic diffusion. More particularly, a computer-implemented method for decompressing SAR images comprises receiving a SAR image to be decompressed, performing a dynamic range compression on the SAR image, quantizing the compressed SAR image, and decompressing the quantized compressed SAR image by applying an anisotropic diffusion algorithm thereto. The quantization may be in unit 8, for example. The dynamic range compression is a non-linear process.

Figure 34:
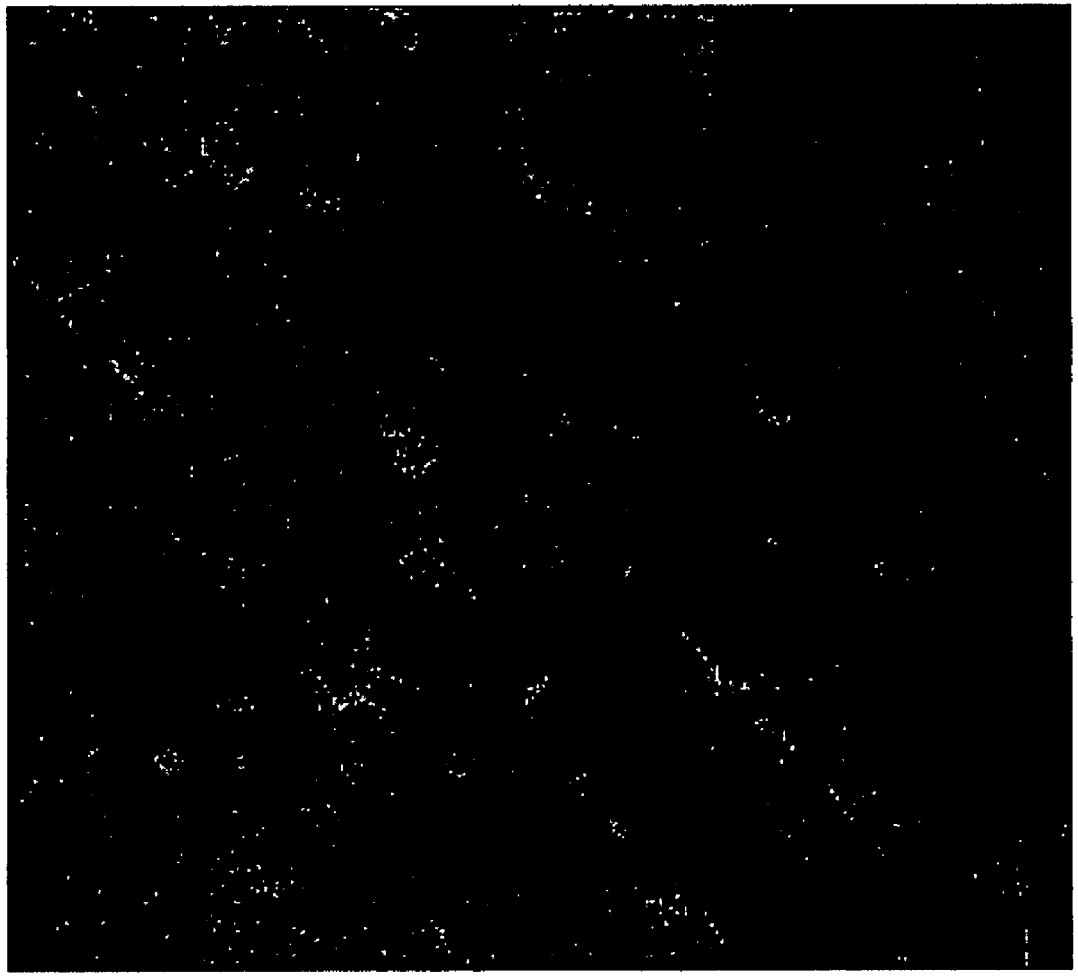
FIGS. 34-36 are images illustrating decompression of SAR data in accordance with the present invention.
Figure 35:
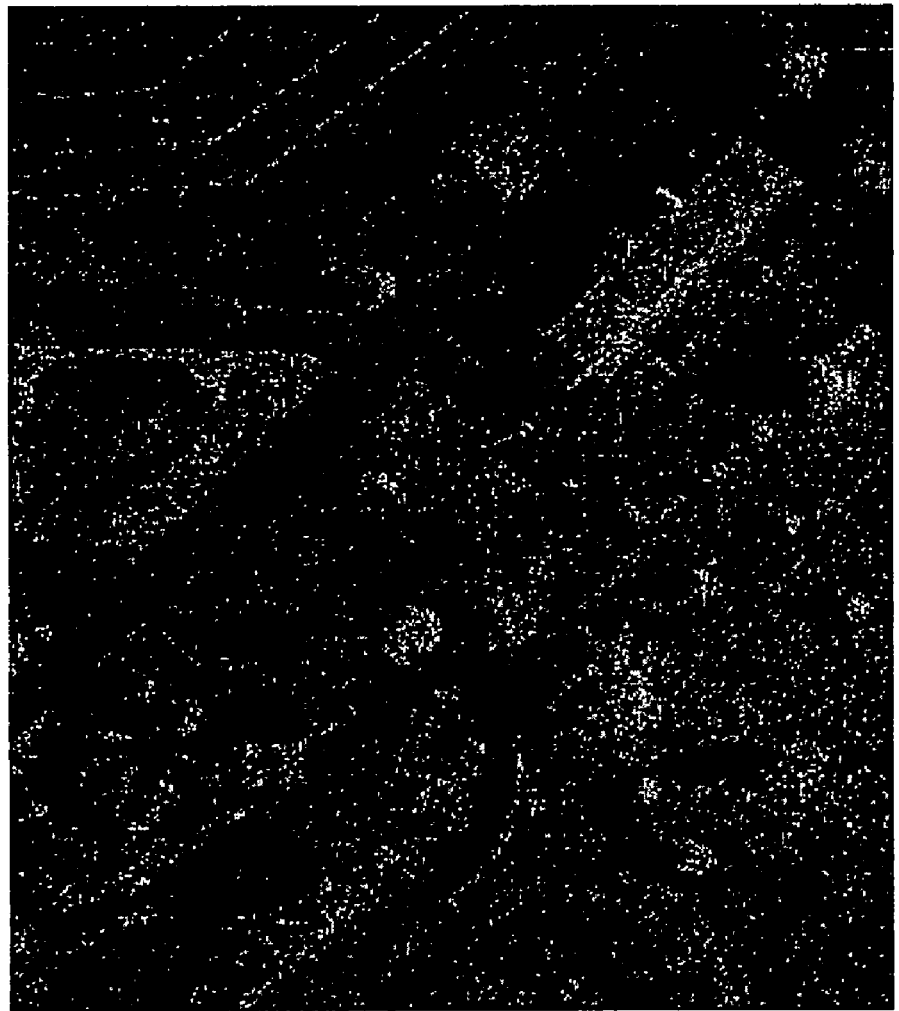
Figure 36:
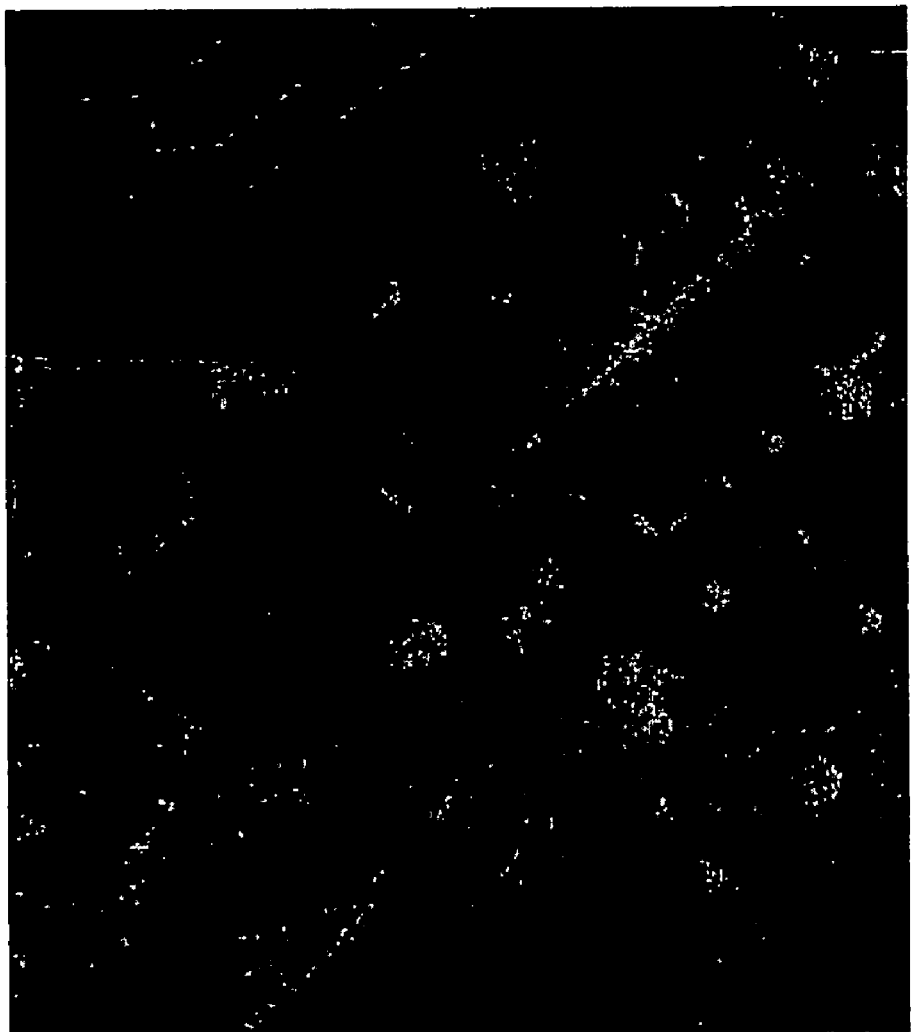

Reference is now directed to FIGS. 34-36 to illustrate the decompression. The original image to be decompressed is shown in FIG. 34, and has an image storage size of 65.68 MB. Non-linear dynamic range compression is applied and the results are quantized in unit 8, as shown in FIG. 35. The image storage size is now 4.11 MB. Tree and shadows are not well defined in the quantized image.

Decompression of the quantized image with an anisotropic diffusion algorithm is shown in FIG. 36. Trees and shadows are now better defined. A shock filter may even be applied to further enhance the viewed SAR image. By dynamically compressing the SAR data and then quantizing that data, the amount of data that is required during transmission is significantly reduced. On average, these data sets would require 4.11/65.7=6.25% of the data of the scene for transmission. The greater the dynamic range the greater the compression ratio. For very bright scatterers in a scene, it gets compressed even more. Even if a user is provided with a lossy compressed/decompressed image, application of the above compression/decompression approaches will actually improve the quality of the original image for viewing.

Elevation extraction/registration using anisotropic diffusion as discussed above for noisy imagery and SAR imagery will now be discussed in reference to FIGS. 37-44. Noisy data effects the accuracy of correlation, registration (same or cross sensor) and elevation extraction. Currently, low pass filters are used for noisy data. Apodization is used for SAR data.

A computer-implemented method for registering SAR images comprises selecting first and second SAR images to be registered, individually processing the selected first and second SAR images with an anisotropic diffusion algorithm, and registering the first and second SAR images after the processing. A shock filter is preferably applied to the respective first and second processed SAR images before the registering. Elevation data may then be extracted based on the registered SAR images.

Figure 37:
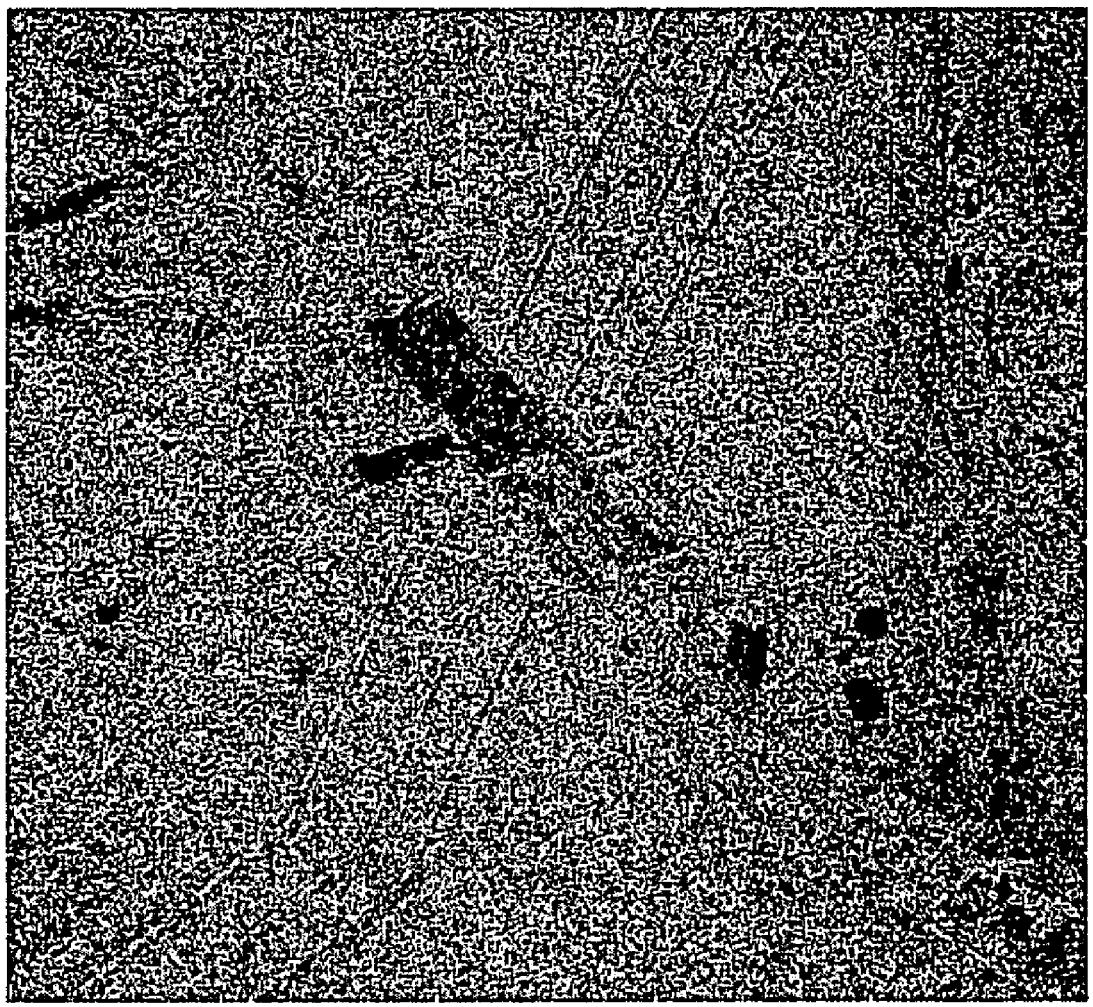
FIGS. 37-44 are images and plots illustrating registration of SAR images in accordance with the present invention.
Figure 38:
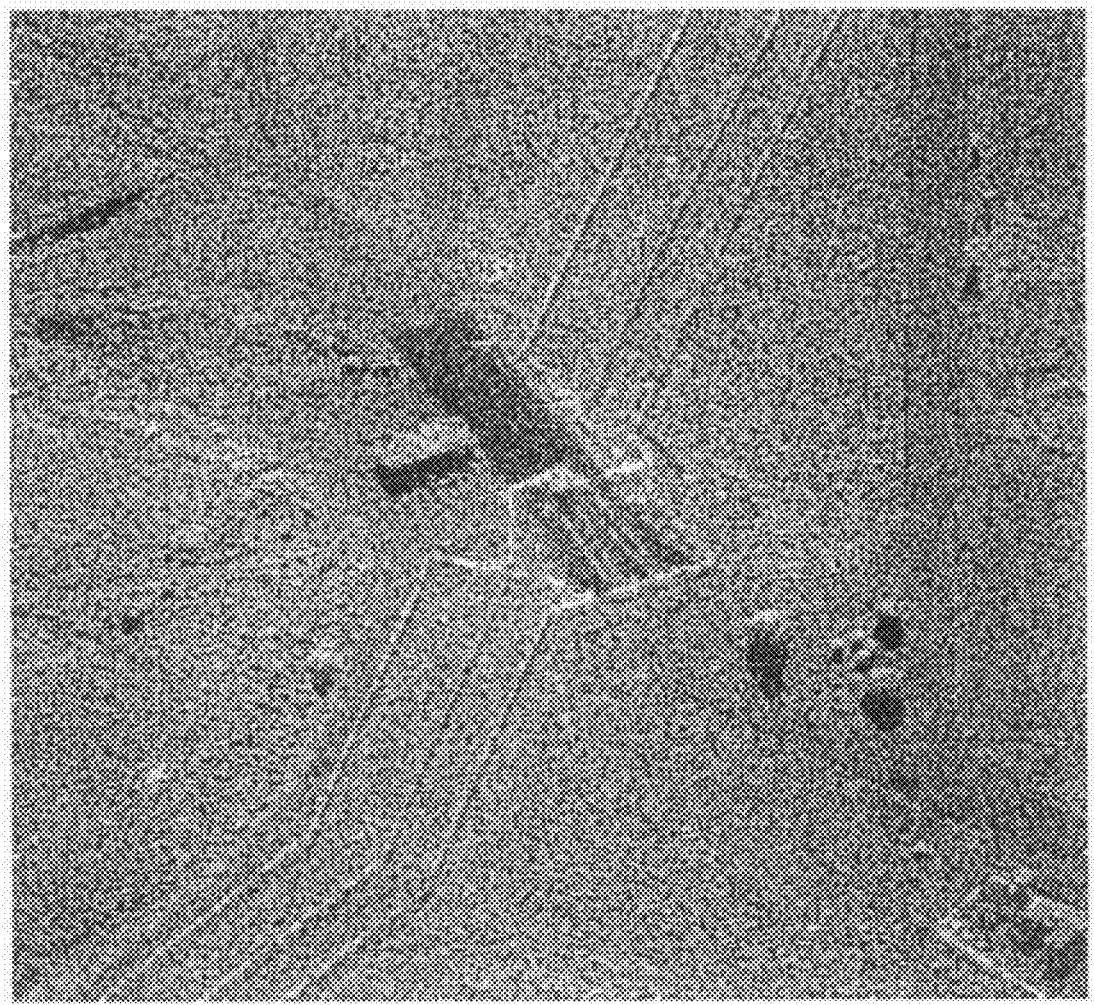

For illustration purposes, two unregistered SAR images are shown in FIGS. 37 and 38. To obtain metrics on the advantages of using an anisotropic diffusion algorithm during the registration, correlation is between image 1 in FIG. 37 which is the reference, and image 2 in FIG. 38 which is the sub-image. A correlation coefficient map for the two images is determined. The maximum value of the correlation map is obtained, i.e., the peak. The peak location on the correlation map indicates the shift between the data, i.e., the registered shift. All of image 1 is correlated with all of image 2. The maximum value of the correlation is obtained after registration. The image is then filtered using the anisotropic diffusion algorithm.

Figure 39:
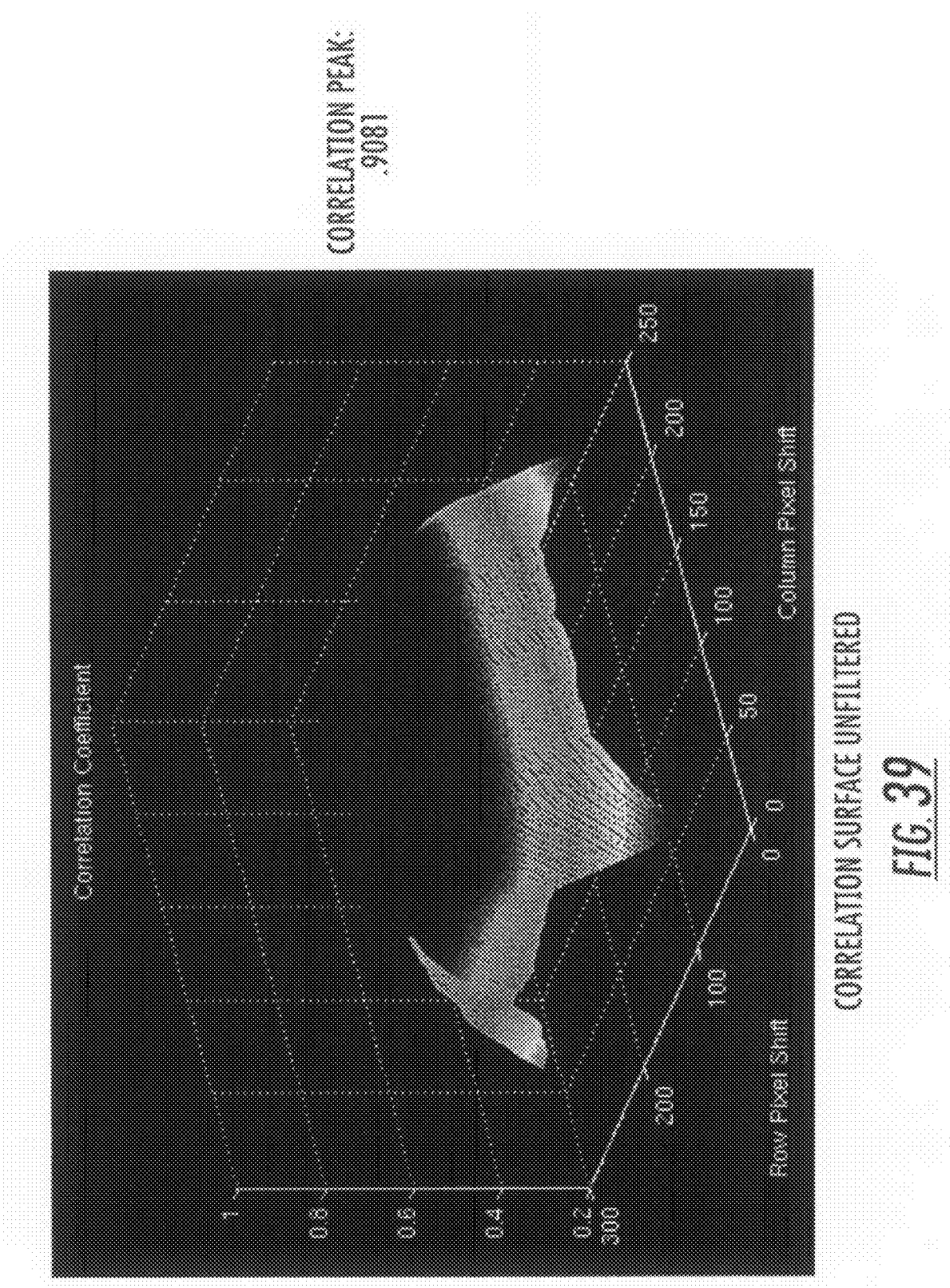
Figure 40:
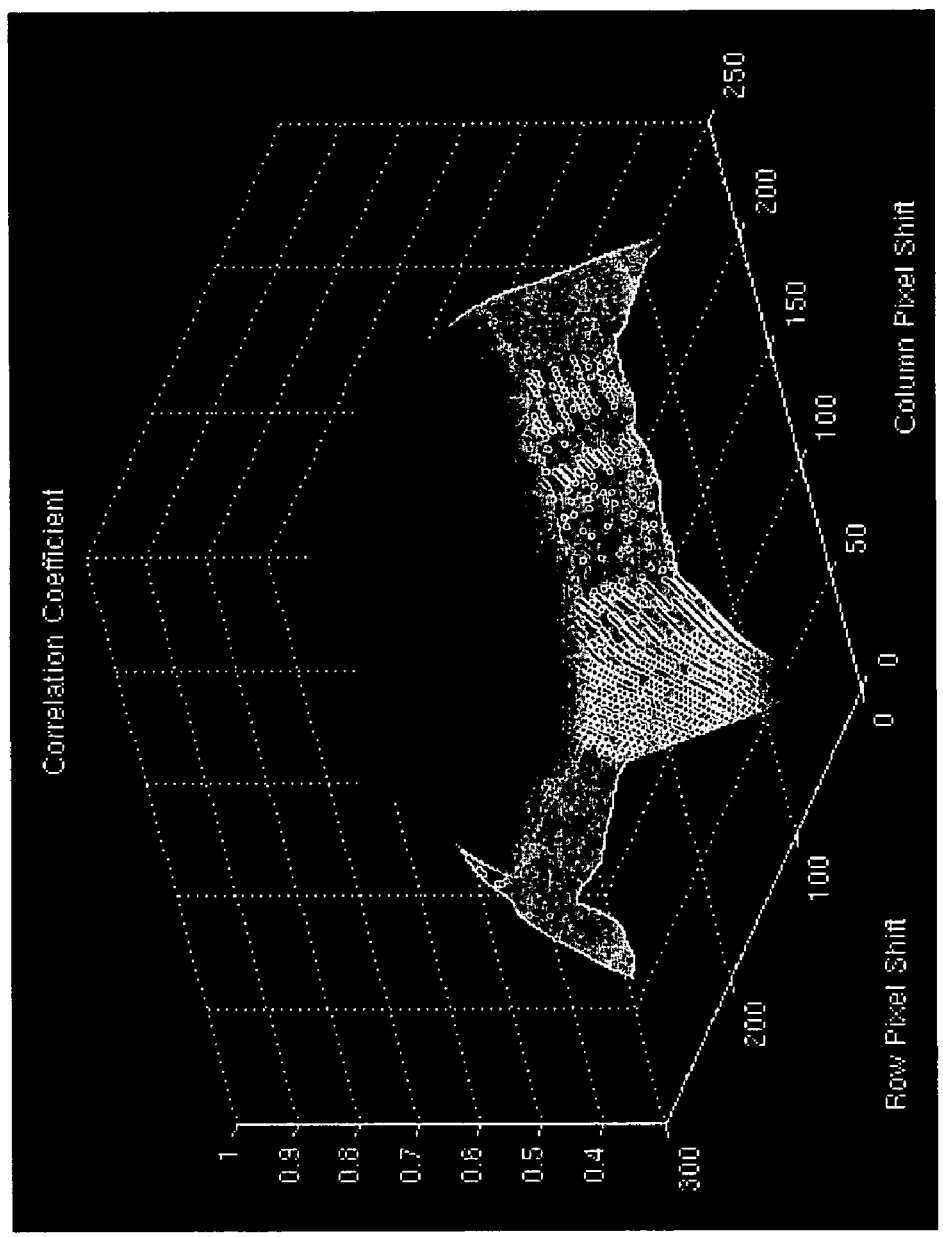
Figure 41:
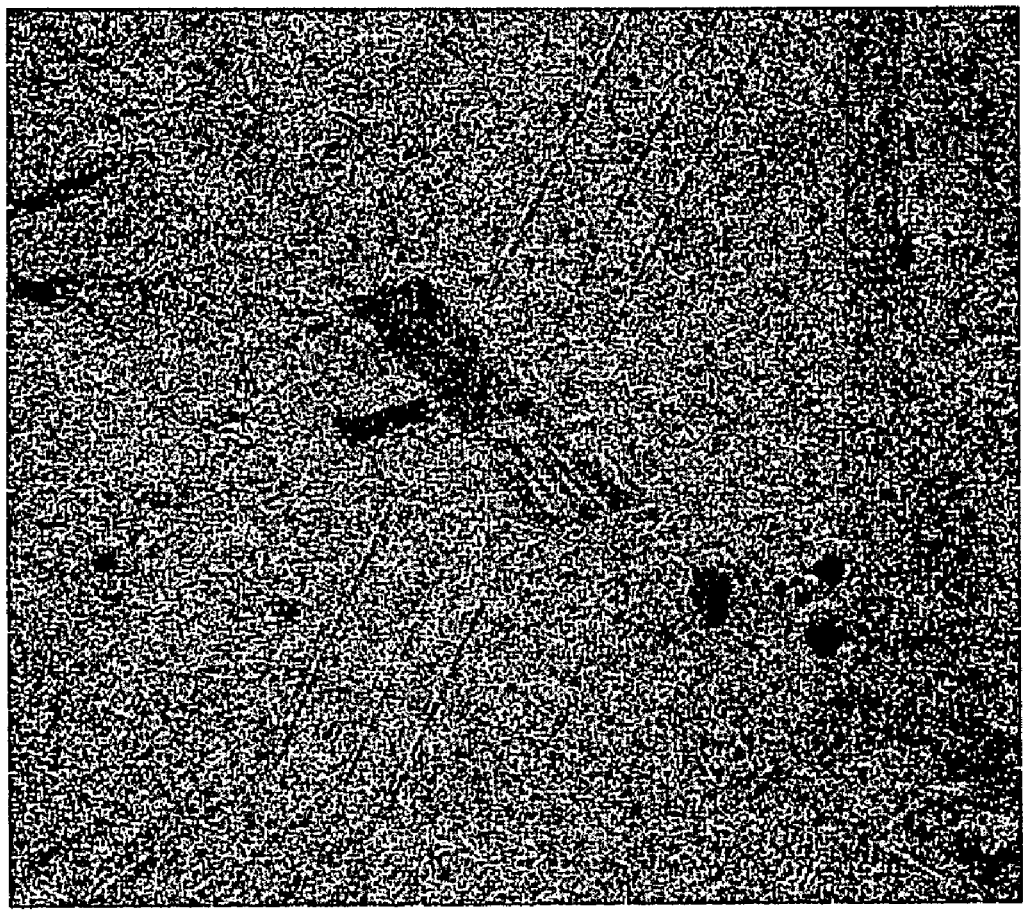
Figure 42:
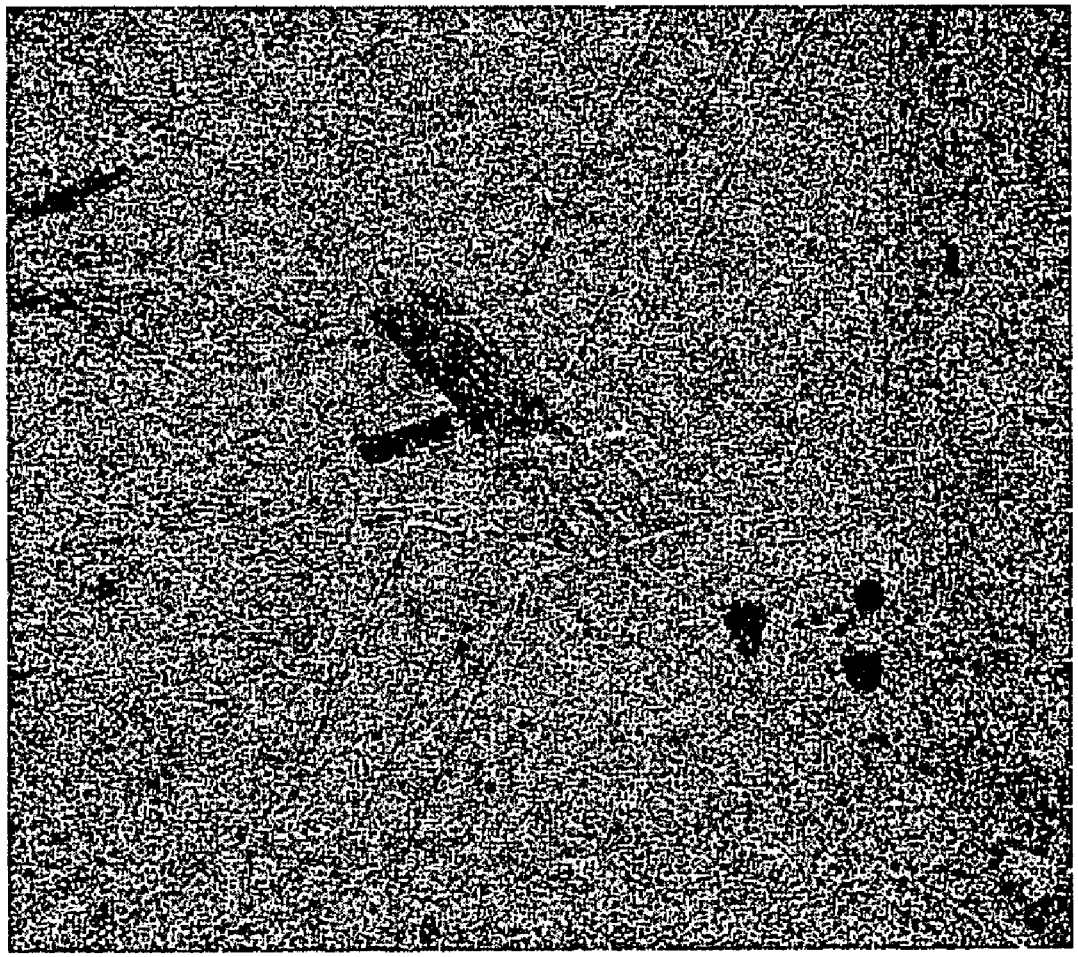
Figure 43:
Figure 44:
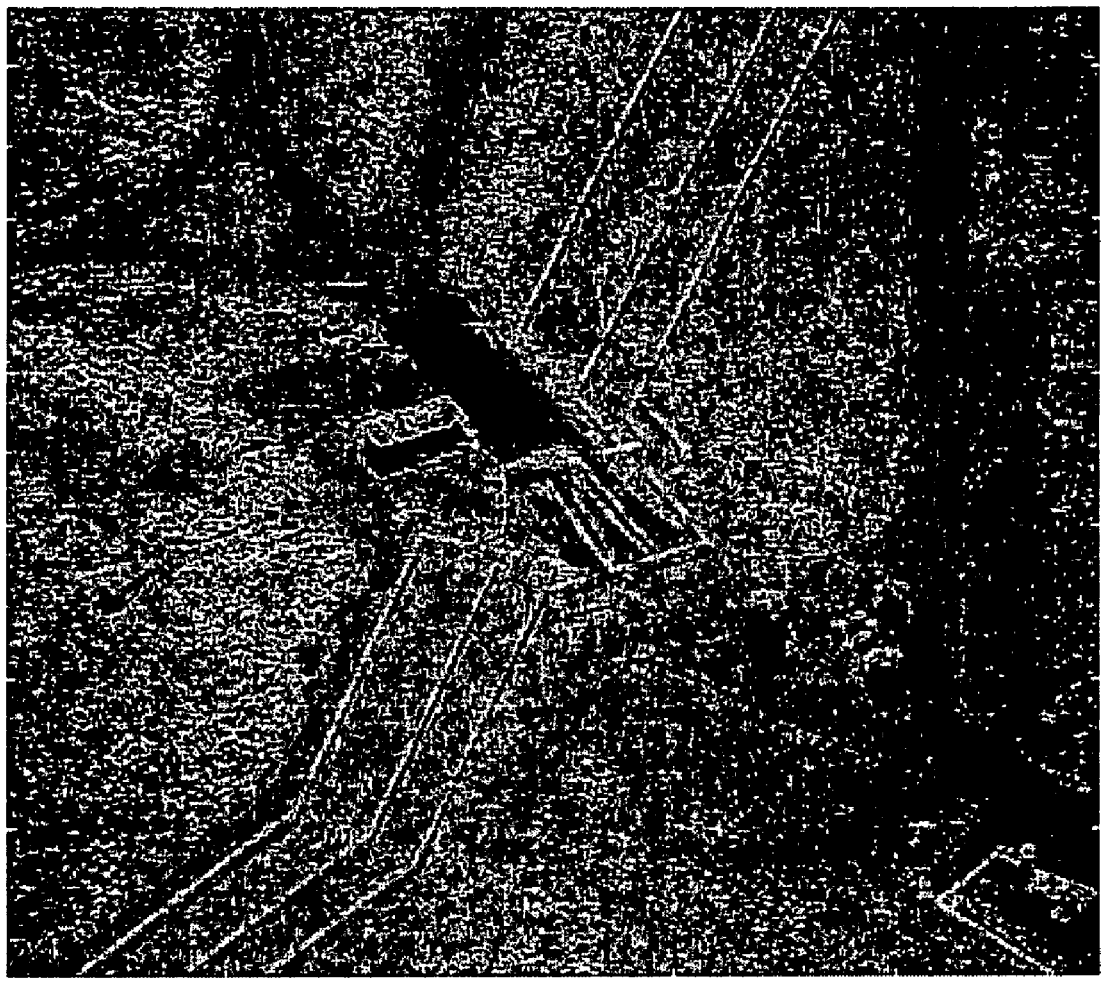

The correlation peak is 0.9081 in the unfiltered correlation surface as shown in FIG. 39. After filtering, the correlation peak is 0.9674 as shown in FIG. 40. After registration is applied, the images from FIGS. 37 and 38 do not move, as shown in FIGS. 41 and 42. These images are not filtered. The correlation peak for registration is 0.9081 and the post correlation of the entire image after registration is 0.3634. After filtering, the corresponding images are shown in FIG. 43-44. The correlation peak for registration is 0.9674 and the post correlation of the entire image after registration is 0.8094. Registration is improved by 9.4%, and correlation is improved after registration by 45%.

Vector and road extraction using non-linear anisotropic diffusion processing and shock filters for material classification will now be discussed in reference to FIGS. 45-48. There is a demand for road extraction of single reflective scenes. Currently, smoothing kernels are applied to the data. Morphological filters are also applied (dilation/erosion) to the data. Vector/road extraction may then be provided using a Gaussian/zero crossing filter.

In accordance with the present invention, a computer-implemented method for vector extraction in SAR images comprises selecting a SAR image for vector extraction, processing the selected SAR image with an anisotropic diffusion algorithm, and extracting vector data based on the processed SAR image. A shock filter may be applied to the processed SAR image before the extracting. Road image data may then be extracted based on the extracted vector data.

Figure 45:
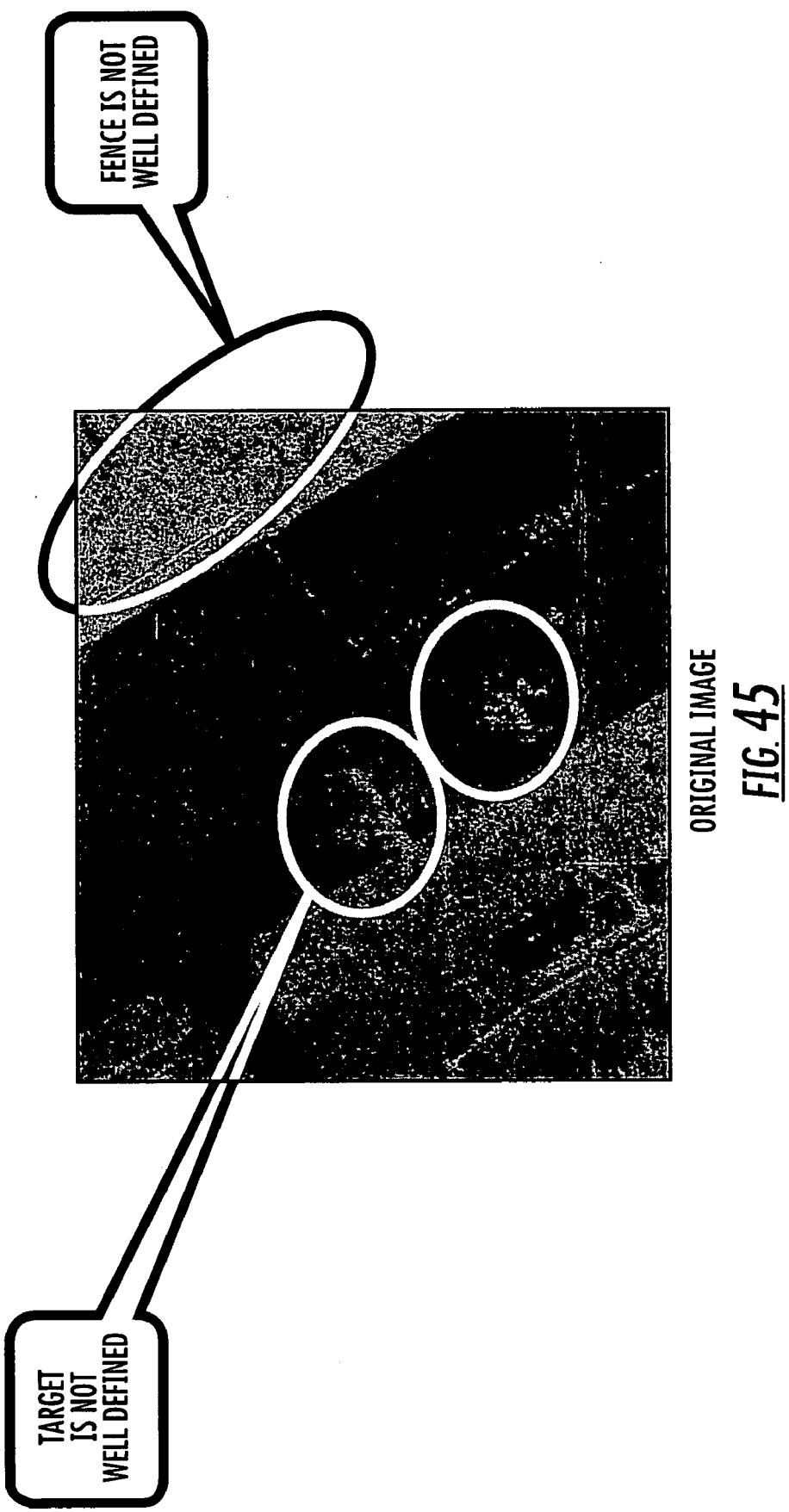
FIGS. 45-48 are images illustrating road extraction in accordance with the present invention.
Figure 46:
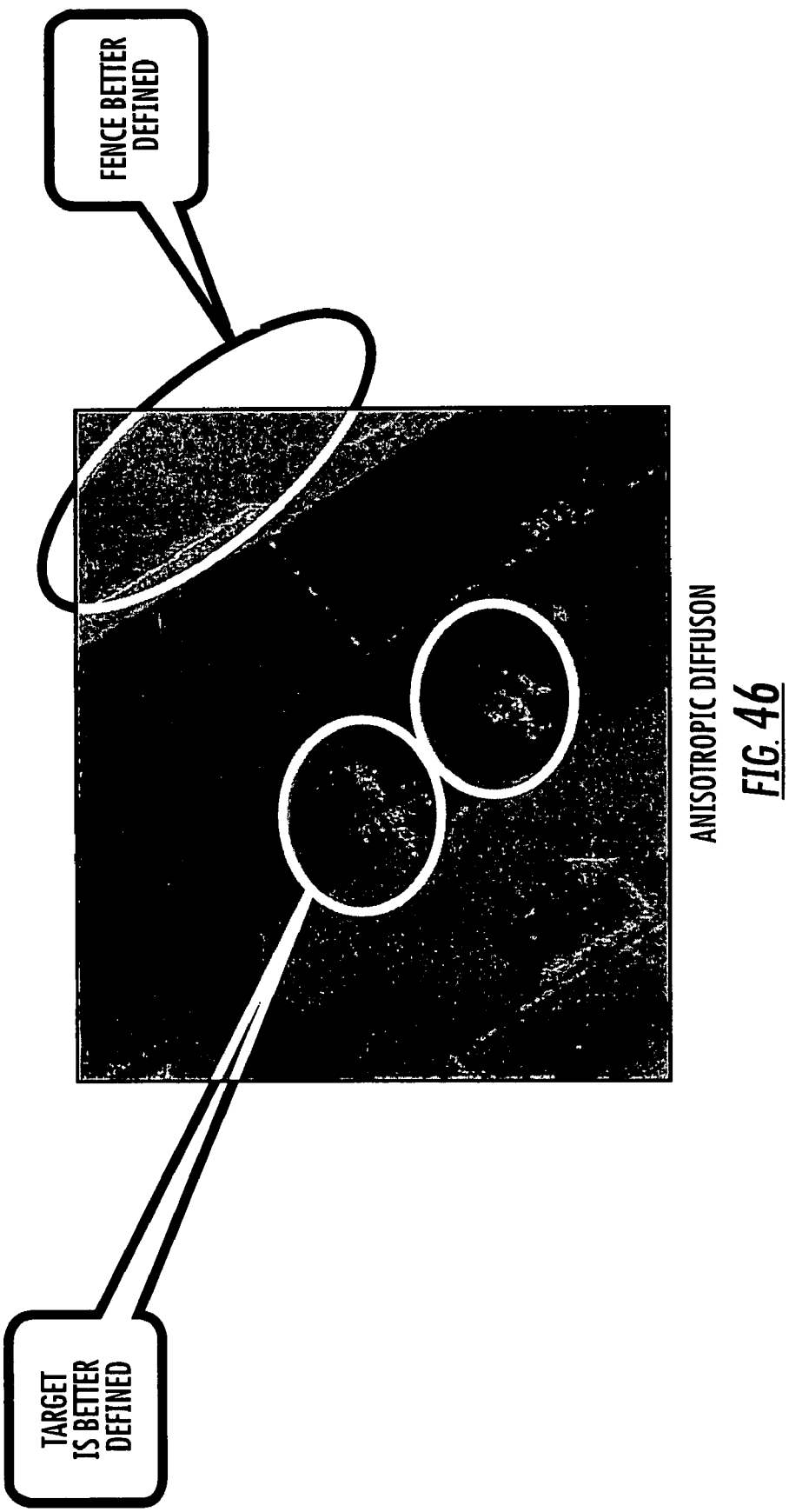

The data is thus delineated using a coherent scheme of the anisotropic diffusion algorithm. This scheme provides higher accuracy for road extraction. An original scene is shown in FIG. 45. After anisotropic diffusion is applied, the target is better defined, as shown in FIG. 46. In general, targets are better delineated for single reflective surfaces. This lends itself well for segmentation.

Figure 47:
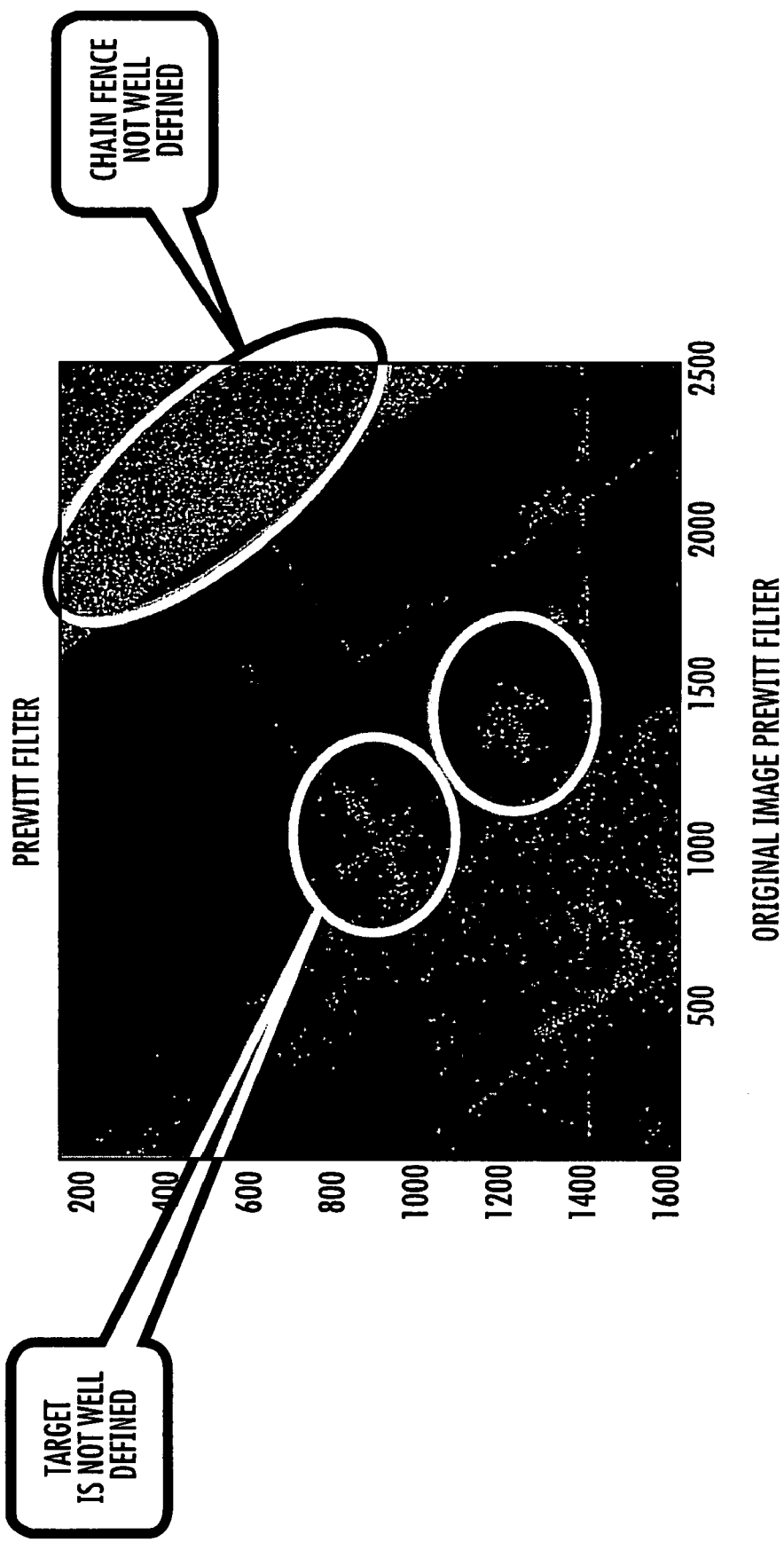
Figure 48:
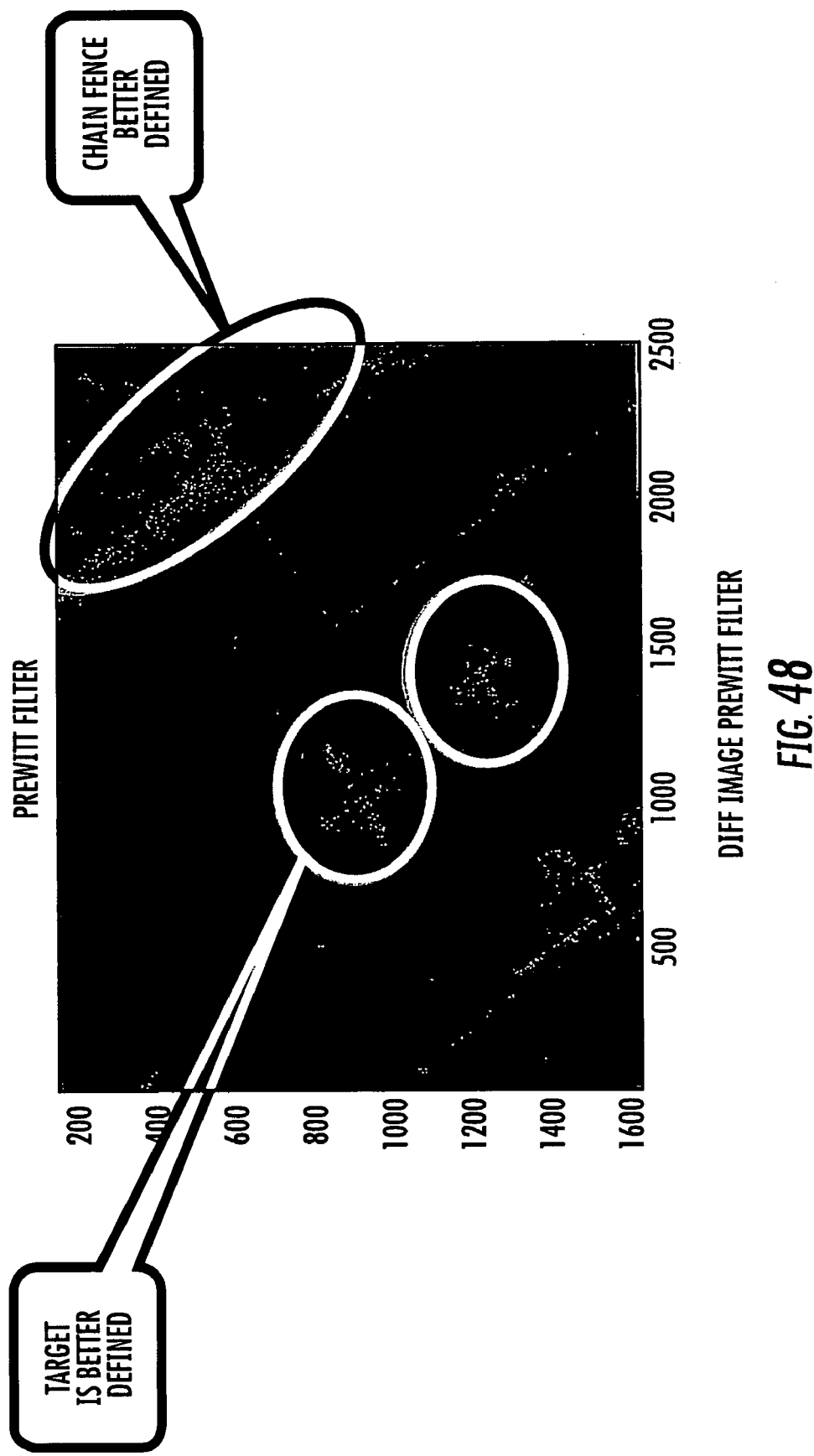

The anisotropic diffusion algorithm may also be applied to other images after they have already been filtered by other filter types. These filter types include a Prewitt filter and a Roberts filter, for example. An original image that was filtered by a Prewitt filter is shown in FIG. 47. FIG. 48 shows the same image after application of the anisotropic diffusion algorithm. The illustrated target as well as the chain link fence are better defined.

In addition, other features relating to SAR images are disclosed in copending patent applications filed concurrently herewith and assigned to the assignee of the present invention and are entitled METHOD AND APPARATUS FOR PROCESSING SAR IMAGES BASED ON AN ANISOTROPIC DIFFUSION FILTERING ALGORITHM, PCT/US08/57618; METHOD AND APPARATUS FOR PROCESSING SAR IMAGES BASED ON A COMPLEX ANISOTROPIC DIFFUSION FILTERING ALGORITHM, PCT/US08/75624; METHOD AND APPARATUS FOR REGISTRATION AND VECTOR EXTRACTION OF SAR IMAGES BASED ON AN ANISOTROPIC DIFFUSION FILTERING ALGORITHM, PCT/US08/57632; METHOD AND APPARATUS FOR PROCESSING COMPLEX INTERFEROMETRIC SAR DATA, PCT/US08/57644; and METHOD AND APPARATUS FOR DECOMPRESSION OF SAR IMAGES, PCT/US08/57653, the entire disclosures of which are incorporated herein in their entirety by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A computer-implemented method for compressing synthetic aperture radar (SAR) images comprising:
   receiving a SAR image to be compressed;
   applying an anisotropic diffusion algorithm to the SAR image; and
   compressing the SAR image after applying the anisotropic diffusion algorithm thereto.

2. A computer-implemented method according to claim 1 wherein applying the anisotropic diffusion algorithm comprises:
   determining noise in the SAR image;
   selecting a noise threshold for the SAR image based on the determined noise; and
   mathematically adjusting the anisotropic diffusion algorithm based on the selected noise threshold.

3. A computer-implemented method according to claim 2 wherein the anisotropic diffusion algorithm is based on a heat equation comprising a non-constant term; and wherein mathematically adjusting the anisotropic diffusion algorithm comprises adjusting the non-constant term.

4. A computer-implemented method according to claim 3 wherein the non-constant term in the heat equation comprises a convection function.

5. A computer-implemented method according to claim 2 further comprising determining gradient values of the SAR image; and wherein determining the noise is based on statistical analysis of the gradient values.

6. A computer-implemented method according to claim 5 wherein the statistical analysis is based on a standard deviation of the gradient values plus a constant.

7. A computer-implemented method according to claim 2 wherein determining the noise is based on a Fourier windowing scheme.

8. A computer-implemented method according to claim 2 wherein determining the noise is based on a wavelet decomposition.

9. A computer-implemented method according to claim 1 wherein the anisotropic diffusion algorithm is based on a second order linear partial differential equation.

10. A computer-implemented method according to claim 1 further comprising storing the compressed SAR image.

11. A computer-implemented method according to claim 1 further comprising transmitting the compressed SAR image.

12. A computer-implemented method according to claim 1 wherein the SAR image comprises complex data.

13. A computer-implemented method for compressing synthetic aperture radar (SAR) images comprising:
   receiving a SAR image to be compressed;
   determining gradient values of the SAR image;
   selecting a noise threshold for the SAR image based on a statistical analysis of the gradient values;
   providing an anisotropic diffusion algorithm based on a heat equation comprising a convection function;
   mathematically adjusting the convection function based on the selected noise threshold; and
   compressing the SAR image after applying the adjusted anisotropic diffusion algorithm thereto.

14. A computer-implemented method according to claim 13 wherein the statistical analysis is based on a standard deviation of the gradient values plus a constant.

15. A computer-implemented method according to claim 13 wherein the anisotropic diffusion algorithm is based on a second order linear partial differential equation.

16. A computer-implemented method according to claim 13 further comprising storing the compressed SAR image.

17. A computer-implemented method according to claim 13 further comprising transmitting the compressed SAR image.

18. A computer-implemented method according to claim 13 wherein the SAR image comprises complex data.

19. A computer-readable medium having computer-executable instructions for causing a computer to perform steps comprising:
   receiving a SAR image to be compressed;
   applying an anisotropic diffusion algorithm to the SAR image; and
   compressing the SAR image after applying the anisotropic diffusion algorithm thereto.

20. A computer-readable medium according to claim 19 wherein applying the anisotropic diffusion algorithm comprises:
   determining noise in the SAR image;
   selecting a noise threshold for the SAR image based on the determined noise; and
   mathematically adjusting the anisotropic diffusion algorithm based on the selected noise threshold.

21. A computer-readable medium according to claim 20 wherein the anisotropic diffusion algorithm is based on a heat equation comprising a non-constant term; and wherein mathematically adjusting the anisotropic diffusion algorithm comprises adjusting the non-constant term.

22. A computer-readable medium according to claim 21 wherein the non-constant term in the heat equation comprises a convection function.

23. A computer-readable medium according to claim 20 further comprising determining gradient values of the SAR image; and wherein determining the noise is based on statistical analysis of the gradient values.

24. A computer-readable medium according to claim 23 wherein the statistical analysis is based on a standard deviation of the gradient values plus a constant.

25. A computer-readable medium according to claim 20 wherein determining the noise is based on a Fourier windowing scheme.

26. A computer-readable medium according to claim 20 wherein determining the noise is based on a wavelet decomposition.

27. A computer-readable medium according to claim 19 wherein the anisotropic diffusion algorithm is based on a second order linear partial differential equation.

28. A computer-readable medium according to claim 19 wherein the SAR image comprises complex data.

29. A computer system for compressing synthetic aperture radar (SAR) images comprising:
   a database for storing SAR images to be compressed; and
   a processor for compressing a SAR image from said database, the compressing comprising
      applying an anisotropic diffusion algorithm to the SAR image, and
      compressing the SAR image after applying the anisotropic diffusion algorithm thereto.

30. A computer system according to claim 29 wherein applying the anisotropic diffusion algorithm comprises:
   determining noise in the SAR image;
   selecting a noise threshold for the SAR image based on the determined noise; and
   mathematically adjusting the anisotropic diffusion algorithm based on the selected noise threshold.

31. A computer system according to claim 30 wherein the anisotropic diffusion algorithm is based on a heat equation comprising a non-constant term; and wherein mathematically adjusting the anisotropic diffusion algorithm comprises adjusting the non-constant term.

32. A computer system according to claim 31 wherein the non-constant term in the heat equation comprises a convection function.

33. A computer system according to claim 30 further comprising determining gradient values of the SAR image; and wherein determining the noise is based on statistical analysis of the gradient values.

34. A computer system according to claim 33 wherein the statistical analysis is based on a standard deviation of the gradient values plus a constant.

35. A computer system according to claim 29 wherein the SAR image comprises complex data.

36. A computer system according to claim 29 further comprising storing the compressed SAR image in the database.

37. A computer system according to claim 29 further comprising transmitting the compressed SAR image.

38. A computer-implemented method for compressing synthetic aperture radar (SAR) images comprising:
receiving a SAR image to be compressed;
applying an anisotropic diffusion algorithm to the SAR image, the applying comprising
determining noise in the SAR image,
selecting a noise threshold for the SAR image based on the determined noise, and
mathematically adjusting the anisotropic diffusion algorithm based on the selected noise threshold; and
compressing the SAR image after applying the anisotropic diffusion algorithm thereto.

39. A computer-implemented method according to claim 38 wherein the anisotropic diffusion algorithm is based on a heat equation comprising a non-constant term; and wherein mathematically adjusting the anisotropic diffusion algorithm comprises adjusting the non-constant term.

40. A computer-implemented method according to claim 39 wherein the non-constant term in the heat equation comprises a convection function.

41. A computer-implemented method according to claim 38 further comprising determining gradient values of the SAR image; and wherein determining the noise is based on statistical analysis of the gradient values.

42. A computer-implemented method according to claim 41 wherein the statistical analysis is based on a standard deviation of the gradient values plus a constant.

43. A computer-implemented method according to claim 38 wherein determining the noise is based on a Fourier windowing scheme.

44. A computer-implemented method according to claim 38 wherein determining the noise is based on a wavelet decomposition.

45. A computer-implemented method according to claim 38 wherein the anisotropic diffusion algorithm is based on a second order linear partial differential equation.

46. A computer-implemented method according to claim 38 further comprising storing the compressed SAR image.

47. A computer-implemented method according to claim 38 further comprising transmitting the compressed SAR image.

48. A computer-implemented method according to claim 38 wherein the SAR image comprises complex data.

49. A computer-readable medium having computer-executable instructions for causing a computer to perform steps comprising:
receiving a SAR image to be compressed;
applying an anisotropic diffusion algorithm to the SAR image, the applying comprising
determining noise in the SAR image,
selecting a noise threshold for the SAR image based on the determined noise, and
mathematically adjusting the anisotropic diffusion algorithm based on the selected noise threshold; and
compressing the SAR image after applying the anisotropic diffusion algorithm thereto.

50. A computer-readable medium according to claim 49 wherein the anisotropic diffusion algorithm is based on a heat equation comprising a non-constant term; and wherein mathematically adjusting the anisotropic diffusion algorithm comprises adjusting the non-constant term.

51. A computer-readable medium according to claim 50 wherein the non-constant term in the heat equation comprises a convection function.

52. A computer-readable medium according to claim 49 further comprising determining gradient values of the SAR image; and wherein determining the noise is based on statistical analysis of the gradient values.

53. A computer-readable medium according to claim 52 wherein the statistical analysis is based on a standard deviation of the gradient values plus a constant.

54. A computer-readable medium according to claim 49 wherein determining the noise is based on a Fourier windowing scheme.

55. A computer-readable medium according to claim 49 wherein determining the noise is based on a wavelet decomposition.

56. A computer-readable medium according to claim 49 wherein the anisotropic diffusion algorithm is based on a second order linear partial differential equation.

57. A computer-readable medium according to claim 49 wherein the SAR image comprises complex data.

58. A computer system for compressing synthetic aperture radar (SAR) images comprising:
a database for storing SAR images to be compressed;
a processor for compressing a SAR image from said database, the compressing comprising
applying an anisotropic diffusion algorithm to the SAR image, and
compressing the SAR image after applying the anisotropic diffusion algorithm thereto; and
storing the compressed SAR image in the database.

59. A computer system according to claim 58 wherein applying the anisotropic diffusion algorithm comprises:
determining noise in the SAR image;
selecting a noise threshold for the SAR image based on the determined noise; and
mathematically adjusting the anisotropic diffusion algorithm based on the selected noise threshold.

60. A computer system according to claim 59 wherein the anisotropic diffusion algorithm is based on a heat equation comprising a non-constant term; and wherein mathematically adjusting the anisotropic diffusion algorithm comprises adjusting the non-constant term.

61. A computer system according to claim 60 wherein the non-constant term in the heat equation comprises a convection function.

62. A computer system according to claim 59 further comprising determining gradient values of the SAR image; and wherein determining the noise is based on statistical analysis of the gradient values.

63. A computer system according to claim 62 wherein the statistical analysis is based on a standard deviation of the gradient values plus a constant.

64. A computer system according to claim 58 wherein the SAR image comprises complex data.

65. A computer system according to claim 58 further comprising transmitting the compressed SAR image.

* * * * *